(12) United States Patent
Chernyshov

(10) Patent No.: US 10,570,519 B2
(45) Date of Patent: Feb. 25, 2020

(54) CONVERSION COATING COMPOSITION COMPRISING A DYE AND A METHOD FOR COATING A METAL SURFACE WITH SAID CONVERSION COATING COMPOSITION

(71) Applicant: Momentive Performance Materials Inc., Waterford, NY (US)

(72) Inventor: Dmitry Chernyshov, Rimpar (DE)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 15/958,276

(22) Filed: Apr. 20, 2018

(65) Prior Publication Data

US 2018/0237920 A1  Aug. 23, 2018

Related U.S. Application Data

(62) Division of application No. 14/842,994, filed on Sep. 2, 2015, now Pat. No. 9,976,218.

(60) Provisional application No. 62/054,694, filed on Sep. 24, 2014.

(51) Int. Cl.
| | |
|---|---|
| *C23C 22/50* | (2006.01) |
| *C23C 22/34* | (2006.01) |
| *C23C 22/53* | (2006.01) |
| *C23C 22/56* | (2006.01) |
| *C09D 5/00* | (2006.01) |

(52) U.S. Cl.
CPC ............... *C23C 22/50* (2013.01); *C09D 5/00* (2013.01); *C23C 22/34* (2013.01); *C23C 22/53* (2013.01); *C23C 22/56* (2013.01)

(58) Field of Classification Search
CPC ......... C23C 22/34; C23C 22/50; C23C 22/53; C23C 22/56; C09D 5/00
See application file for complete search history.

(56) References Cited

U.S. PATENT DOCUMENTS

| | | |
|---|---|---|
| 4,338,140 A | 7/1982 | Reghi |
| 4,992,115 A | 2/1991 | Ikeda |
| 6,410,926 B1 | 6/2002 | Munro et al. |
| 6,464,800 B1 | 10/2002 | Carlson et al. |
| 7,491,274 B2 | 2/2009 | Carey et al. |
| 7,815,751 B2 | 10/2010 | Pemberton et al. |
| 8,012,254 B2 | 9/2011 | Carlini et al. |
| 8,025,723 B2 | 9/2011 | Carlini et al. |
| 8,101,014 B2 | 1/2012 | Kolberg et al. |
| 8,436,093 B2 | 5/2013 | Inbe et al. |
| 8,535,456 B2 | 9/2013 | Ishii et al. |
| 9,012,558 B2 | 4/2015 | Lucas |
| 9,810,630 B1* | 11/2017 | Wegner .................. G01N 21/64 |
| 2007/0095435 A1 | 5/2007 | Lammerschop et al. |
| 2012/0199250 A1* | 8/2012 | Zoboli .................... C23C 22/34 148/244 |
| 2014/0296553 A1 | 10/2014 | Simandan et al. |
| 2014/0342164 A1 | 11/2014 | Hwang |

FOREIGN PATENT DOCUMENTS

| | | |
|---|---|---|
| EP | 1 240 258 B1 | 11/2005 |
| WO | 2000/26437 A1 | 5/2000 |
| WO | 2007/128807 A1 | 11/2007 |
| WO | 2009/020794 A2 | 2/2009 |
| WO | 2012/106037 A2 | 8/2012 |

OTHER PUBLICATIONS

Masters Thesis of Vignesh Marudhanayagam Palanivel, "Modified silane thin films as an alternative to chromates for corrosion protection of AA2024-T3 alloy", Jul. 25, 2003, University of Cincinnati.

International Search Report and Written Opinion dated Nov. 23, 2015.

* cited by examiner

*Primary Examiner* — Frances Tischler
(74) *Attorney, Agent, or Firm* — James C. Abruzzo

(57) ABSTRACT

The invention is directed to a conversion coating composition for coating a metal surface including a water soluble dye, at least one metal compound selected from the group consisting of a zirconium-containing compound, titanium-containing compound and silicon-containing compound; and water, wherein the provides for qualitative characterization of the conversion coating uniformity and thickness by the naked human eye or visible light detecting device; and, a method for coating the metal surfaces using the conversion coating composition.

17 Claims, 7 Drawing Sheets

CONVERSION COATING COMPOSITION COMPRISING A DYE AND A METHOD FOR COATING A METAL SURFACE WITH SAID CONVERSION COATING COMPOSITION

CROSS-REFERENCE TO RELATED APPLICATIONS

The present application is a divisional application of U.S. patent application Ser. No. 14/842,994 filed Sep. 2, 2015, which claims priority to Provisional U.S. Patent Application No. 62/054,694 filed Sep. 24, 2014, the entire contents of both earlier applications are incorporated by reference herein.

FIELD OF INVENTION

The invention relates to a coating composition for metals. Particularly, the invention relates to a non-chromate, non-metal phosphate conversion coating for metal substrates, especially steel, zinc coated steel, and aluminum surfaces wherein the conversion coating, in addition to the contents of the conversion coating comprises a dye to provide a means for determining the uniformity and thickness of the conversion coating on the surface.

BACKGROUND OF THE INVENTION

A variety of commercial coating compositions are known for preparing metal surfaces to prevent corrosion and improve adhesion of paints or other coatings to the surface. For example, conversion coatings are used in commercial applications to provide anticorrosion properties to metal surfaces and/or to prepare the metal surfaces prior to painting operations. However, some conversion coatings, such as silane conversion coatings are colorless, are applied at very low coating weights, and are extremely difficult to detect by human visual inspection or colorimetric measuring devices.

Methods for determining the presence of thin films on a substrate are known. Certain fluorescent dyes in metal film coatings have been used to determine whether or not the coating has been applied to the surface. Specifically, the fluorescent brightening agents, such as stilbene and coumarin, have been added to chrome-free metal coatings. The fluorescent brightening agents allow for ultraviolet (UV) viewing of the coated metal under a UV light and detect the presence of the conversion coating by eye. These methods are useful in their ability to determine whether a coating has been applied to a substrate and to provide qualitative determination of the thickness of the coating, an important quality control matter.

Unfortunately however, the use of stilbene and coumarin to provide for quantitative determinations of coating thickness is not preferred because these compounds often do not display the required precision when they are used in a calibrated system to determine coating thickness. High precision is required in a commercially feasible coating thickness measurement system. The native fluorescence of the coating can interfere with measurement of fluorescent intensity of the coating.

In addition, many organic dyes are not readily soluble in waterborne conversion coatings, and thus, often affect the stability of the conversion coating. Addition of these organic dyes to conversion coatings results in precipitation or gelation of the other components of the conversion coating, thereby making the conversion coating composition unstable. The poor shelf-life of the conversion coating affects the usability of these conversion coatings because the precipitation or gelation results in non-uniform coating or the formation of voids or poorly coated surfaces. Poor corrosion resistance and poor adhesion of paints or other coatings to the metal substrate results when these unstable conversion coatings are used. Accordingly, there is a need to be able to quickly detect the presence, uniformity and thickness of these conversion coatings as an essential aspect of quality control, while avoiding the problems noted above with many organic dyes.

SUMMARY OF THE INVENTION

The present invention pertains to a conversion coating for coating the surfaces of a metal substrate, such as steel, zinc coated steels, and aluminum, to provide for the formation of a conversion coating which is detectable, quantifiable and also increases the corrosion resistance of the metal substrate and/or the adhesion properties of the metal substrate.

In one embodiment herein there is provided a conversion coating for coating a metal surface, wherein the conversion coating comprises:
(i) at least one metal corrosion inhibitor selected from the group consisting of zirconium-containing compound, titanium-containing compound and silicon-containing compound;
(ii) water; and,
(iii) at least one water soluble dye such that when the conversion coating composition is applied to a metal surface, the dye is visible to the naked eye and/or its presence is detectable and its intensity is measurable by optical instrumentation, provided that when the at least one metal corrosion inhibitor (i) is a silicon-containing compound, then the silicon-containing compound is used in combination with a metal fluoride-containing compound.

The methods of the invention comprise applying the herein described conversion coating to a metal surface; and then optionally, measuring the intensity of the water-soluble dye within a predetermined area of the applied conversion coating composition by optical instrumentation to provide a measured intensity of the dye; and, relating the measured intensity of the dye to the thickness and/or uniformity of the applied conversion coating.

BRIEF DESCRIPTION OF THE DRAWINGS

The use of the term "bath" herein refers to a conversion coating composition of the respective number as defined in the examples.

DETAILED DESCRIPTION OF THE INVENTION

Figure 1:
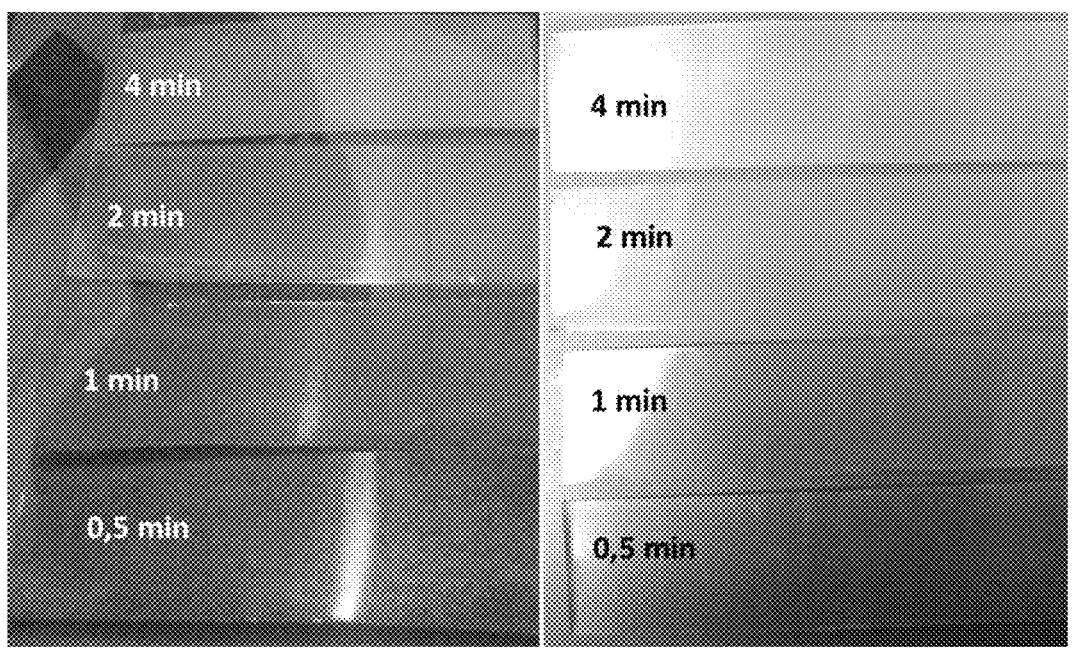
FIG. 1 is a set of photographs of four aluminum strips which were cleaned with a silicate cleaner and coated with the conversion coating described in Example 1 for a period of 0.5, 1, 2 and 4 minutes dwell time in the conversion coating composition, Bath 1, wherein the left most photographs are viewed under a black light and the rightmost photographs are viewed under daylight.

In accordance with the invention, it has been discovered that conversion coating compositions, specifically, chrome-free, and more specifically phosphate-free detectable conversion coatings, are provided on a metal substrate by contacting the desired metal surface with said conversion coating composition, wherein said conversion coating composition comprises:
(i) at least one metal corrosion inhibitor selected from the group consisting of zirconium-containing compound, titanium-containing compound and silicon-containing compound;
(ii) water; and,
(iii) at least one water soluble dye such that when the conversion coating composition is applied to a metal surface, the dye is visible to the naked eye and/or its presence is detectable and its intensity is measurable by optical instrumentation, provided that when the at least one metal corrosion inhibitor (i) is a silicon-containing compound, then the silicon-containing compound is used in combination with a metal fluoride-containing compound The substrate includes electrogalvanized steel, cold rolled steel, hot dip galvanized steel, aluminum, and other metals. Specifically, the dye is visible to the naked eye when applied, does not impair the chemical or physical properties of the conversion coating, allows for uniform deposit of the conversion coating and provides for an easy means of qualitative characterization of the uniformity and thickness of the conversion coating.

Aqueous detectable conversion coatings of the invention provide improved corrosion resistance of bare and painted metal, and adhesion of applied coatings to painted metal. In the context of the invention, the term "bare metal" refers to metal surfaces that are treated with the conversion coating of the invention but which have not been painted.

In one specific embodiment herein, it will be understood that all ranges herein comprise can comprise all ranges there between, and any combination of endpoints of said ranges and/or subranges thereof.

The expression "conversion coating composition" as used herein comprises water, at least one metal corrosion inhibitor selected from the group consisting of a zirconium-containing compound, a titanium-containing compound and a silicon-containing compound.

The conversion coating composition of the present invention requires at least one metal corrosion inhibitor selected from the group consisting of a zirconium-containing compound, a titanium-containing compound and a silicon-containing compound, water and at least one water soluble dye, where the silicon-containing compound is used in combination with at least one metal fluoride compound. More specifically, the silicon-containing compound is an alkoxysilane and/or hydrolyzates and/or condensates thereof containing a functional group. The conversion coating may further comprise at least one additive selected from the group consisting of a colloidal metal oxide, a stabilizing agent, an alkoxysilane adjuvant which does not contain a functional group, and a pH adjusting agent.

In one embodiment herein there is provided a conversion coating comprising:
(i) at least one metal-corrosion inhibitor in the amount of from 0.01 to 80 weight percent and selected from the group consisting of:
(a) zirconium-containing compounds having the structure of formula (III):

$$[ZrL^1{}_4]_b$$

wherein
each occurrence of $L^1$ is independently $NO_3$—, —F, $[—O—]_{1/2}$, $[=O]_{1/2}$ or —$OR^4$, where each occurrence of $R^4$ is independently selected from the group consisting of acetyl, alkyl, cycloalkyl, aryl, aralkyl, alkoxy-substituted alkyl and hydroxyl-substituted alkyl groups containing up to about 16 carbon atoms, more specifically from 1 to 12 carbon atoms, and hydrogen; and
the subscript b is an integer of from 1 to 100, more specifically 1 to 15, and even more specifically 1, with the provisos that
(i) when $L^1$ is $[=O]_{1/2}$, then a second $L^1$ group is a $[=O]_{1/2}$ group, which is bonded to the same zirconium atom having the structure $[=O]_{1/2}$, and the two $L^1$ having the structure $[=O]_{1/2}$ are combined to form a double bond between the oxygen and zirconium atom; and
(ii) when c is equal to or greater than 2, then at least one $L^1$ in each repeat unit $[ZrL^1{}_4]$ is a $[—O—]_{1/2}$ group and each $[—O—]_{1/2}$ in the repeat unit is combined with another $[—O—]_{1/2}$ group in a different repeat unit to form a Zr—O—Zr bond which links the repeat units together;
(b) titanium-containing compounds having the structure of formula (IV):

$$[TiL^2{}_4]_c$$

wherein
each occurrence of $L^2$ is independently $NO_3$—, —F, $[—O—]_{1/2}$, $[=O]_{1/2}$ or —$OR^5$, where each occurrence of $R^5$ is independently selected from the group consisting of acetyl, alkyl, cycloalkyl, aryl, aralkyl, alkoxy-substituted alkyl and hydroxyl-substituted alkyl groups containing up to about 16 carbon atoms, more specifically from 1 to 12 carbon atoms, and hydrogen; and
the subscript c is an integer of from 1 to 100, more specifically 1 to 15, and even more specifically 1, with the provisos that
(i) when $L^2$ is $[=O]_{1/2}$, then a second $L^2$ group is a $[=O]_{1/2}$ group which is bonded to the same titanium atom having the structure $[=O]_{1/2}$, and the two $L^2$ having the structure $[=O]_{1/2}$ are combined to form a double bond between the oxygen and titanium atom; and
(ii) when c is equal or greater than 2, then at least one $L^2$ in each repeat unit $[TiL^2{}_4]$ is a $[—O—]_{1/2}$ group and each $[—O—]_{1/2}$ in the repeat unit is combined with another $[—O—]_{1/2}$ group in a different repeat unit to form a Ti—O—Ti bond which links the repeat units together;
(c) silicon-containing compound having the structure of formula (V):

$$[X[—R^1—Si(R^2)_aL^3{}_{3-a}]_r]_s$$

wherein
- X is a functional group of valence r, including mono-, di-, or polyvalent groups;
- each occurrence of $R^1$ is independently a linear, branched or cyclic divalent hydrocarbon group containing up to about 12 carbon atoms, more specially from 1 to 6 carbon atoms, and optionally containing one or more heteroatoms, with the proviso that X and the silicon atom of the silyl group are bonded to the $R^1$ group through a covalent bond to a carbon atom of $R^1$, thereby forming a bridge between functional group X and the silyl group;
- each occurrence of $R^2$ is independently a monovalent group selected from the group consisting of an alkyl, cycloalkyl, aryl and aralkyl groups containing up to about 16 carbon atoms, more specifically from 1 to 12 carbon atoms;
- each $L^3$ is independently F—, $[-O-]_{1/2}$ or $-OR^3$, wherein each occurrence of $R^3$ is independently selected from the group consisting of acetyl, alkyl, cycloalkyl, aryl, aralkyl, alkoxy-substituted alkyl and hydroxyl-substituted alkyl groups containing up to about 16 carbon atoms, more specifically from 1 to 12 carbon atoms, and hydrogen;
- r is an integer of from 1 to 4;
- s is an integer of from 1 to 100, more specifically 1 to 15 and even more specifically 1; and
- a is 0, 1 or 2, with the proviso that when s is equal to or greater than 2, then at least one $L^3$ in the repeat unit $[X[-R^1-Si(R^2)_a L^3_{3-a}]_r$ is a $[-O-]_{1/2}$ group and each $[-O-]_{1/2}$ in the repeat unit is combined with another $[-O-]_{1/2}$ group in a different repeat unit to form a Si—O—Si bond which links the repeat units together; and, mixtures thereof;

(ii) water; and, (iii) a water soluble dye, wherein said dye is a water soluble organic dye having a positive charge and a counterion derived from a carboxylic acid containing from 1 to about 6 carbon atoms in an amount of from 0.0001 to about 5 weight percent and having the structure of formula (I):

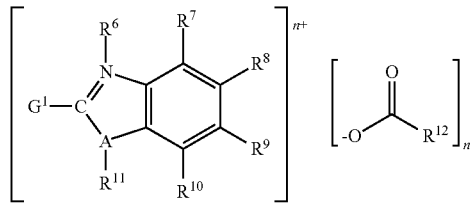

wherein:
- $G^1$ is an organic group having from 1 to about 20 carbon atoms and containing at least one oxygen or nitrogen heteroatom;
- A is a nitrogen atom or $(-)_3C-R^*$, where $R^*$ is a monovalent group chosen from alkyl, cycloalkyl, alkenyl, aralkyl or aryl group each having up to about 10 carbon atoms, more specifically from 1 to 8 carbon atoms;
- $R^6$ is an alkyl, a hydroxylalkyl, an alkoxyalkyl, a cycloalkyl, an aralkyl optionally substituted with a halogen or alkoxy group, an aryl optionally substituted with a halogen or alkoxy group, a cyanoalkyl, a carbamatoalkyl or a carboalkoxyalkyl group containing up to about 10 carbon atoms, more specifically from 1 to 7 carbon atoms, or hydrogen;
- $R^7$ is an alkyl, alkoxy, aryl alkylsulfonyl, or arylsulfonyl group containing up to about 10 carbon atoms, more specifically from 1 to 7 carbon atoms, or hydrogen;
- $R^8$ is an alkyl, alkoxy, aryl alkylsulfonyl, arylsulfonyl, or aminosulfonyl group containing up to about 10 carbon atoms, more specifically from 1 to 7 carbon atoms, or hydrogen;
- $R^9$ is an alkyl, alkoxy, aryl alkylsulfonyl, or arylsulfonyl group containing up to about 10 carbon atoms, more specifically from 1 to 8 carbon atoms, or hydrogen;
- $R^{10}$ is an alkyl, alkoxy, aryl alkylsulfonyl, or arylsulfonyl group containing up to about 10 carbon atoms, more specifically from 1 to 8 carbon atoms, or hydrogen;
- $R^{11}$ is an alkyl, a hydroxylalkyl, an alkoxyalkyl, cycloalkyl, an aralkyl optionally substituted with a halogen or alkoxy group, an aryl optionally substituted with a halogen or alkoxy group, a cyanoalkyl, a carbamatoalkyl or an alkoxycarbonylalkyl group containing up to about 10 carbon atoms, more specifically from 1 to 8 carbon atoms, or hydrogen,
- $R^{12}$ is an alkyl group containing from 1 to about 6 carbon atoms or hydrogen; and
- n is an integer of from 1 to 3;

or a structure (II):

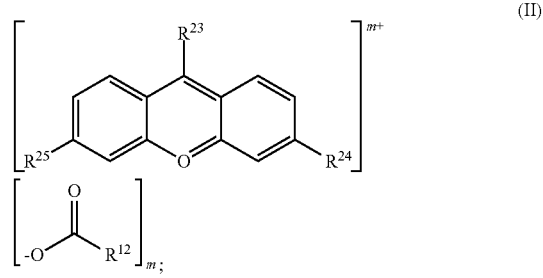

wherein:
- $R^{12}$ is an alkyl group containing from 1 to about 6 carbon atoms or hydrogen;
- $R^{23}$ is hydrogen, an alkyl group of from 1 to about 6 carbon atoms, an aryl group of from 6 to about 10 carbon atoms, an aralkyl group of from 7 to about 12 carbon atoms or an aryl group of from 6 to about 12 carbon atoms substituted with a hydroxycarbonyl group (—C(═O)OH) or susbstituted with an alkoxycarbonyl group —C(═O)OR$^{26}$, where $R^{26}$ is an alkyl group of from 1 to about 4 carbon atoms;
- $R^{24}$ is hydrogen, an alkyl group containing 1 to about 6 carbon atoms, hydroxyl or amino having the structure —NR$^{27}$R$^{28}$, where $R^{27}$ and $R^{28}$ are each independently a hydrogen or alkyl group of from 1 to about 6 carbon atoms;
- $R^{25}$ is hydrogen, an alkyl group containing 1 to about 6 carbon atoms, hydroxyl or amino having the structure —NR$^{27}$R$^{28}$, where $R^{27}$ and $R^{28}$ are each independently a hydrogen or alkyl group of from 1 to about 6 carbon atoms; and
- m is an integer from 1 to 3;

wherein (a), (b) and (c) are present in an amount such that the sum of all the components of the conversion coating composition is 100 weight percent, wherein the percents by weight of each component are based upon the total weight of conversion coating composition and with the provisos that when the metal-corrosion inhibitor (i) is a silicon-containing compound, then the conversion coating composition contains at least one metal fluoride-containing compound, and wherein said conversion coating composition does not contain detrimental amounts of precipitates for a period of at least 48 hours when stored at about 25° C.

In one non-limiting embodiment herein the at least one corrosion inhibitor (i) is a zirconium-containing compound is selected from the group consisting of $H_2ZrF_6$, $(NH_4)_2ZrF_6$, $Na_2ZrF_6$, $K_2ZrF_6$, $ZrO[NO_3]_2$, $Zr[SO_4]_2$, $ZrOSO_4$ and mixtures thereof.

In one other non-limiting embodiment herein the at least one corrosion inhibitor (i) is a titanium-containing compound selected from the group consisting of $H_2TiF_6$, $(NH_4)_2TiF_6$, $Na_2TiF_6$, $K_2TiF_6$, $Ti[SO_4]_2$, and mixtures thereof.

In one embodiment the corrosion inhibitor is a zirconium-containing compound, a titanium-containing compound or mixtures thereof.

The expression "stable suspension" as used herein comprises a suspension exhibiting little or no change in physical appearance, such as visible sedimentation or gelling for a period of at least 2 days of continuous, undisturbed storage at a temperature of from about 10 to about 70° C., and more specifically, at a temperature of from about 15 to about 35° C. and even more specifically 25° C. It will be understood herein that in one embodiment, the stable suspension can be the conversion coating itself without the addition of other components, or alternatively, the stable suspension can be the conversion coating itself with the addition of optional additional components, such as the non-limiting examples of stabilizing agent and the like. In one non-limiting embodiment herein it will be understood that the expressions "conversion coating", "conversion coating composition" or "composition" are used interchangeably and the expression "stable suspension" can be used with conversion coating compositions to indicate that when the composition contains a suspension, then the suspension is a stable suspension. It will be understood herein that the ranges of amounts of various components described herein are based on the total weight of the conversion coating.

The expression "stable conversion coating composition" as used herein comprises a conversion coating composition exhibiting little or no change in physical appearance, such as visible sedimentation or gelling for a period of at least 2 days of continuous, undisturbed storage at a temperature of from about 10 to about 70° C., and more specifically, at a temperature of from about 15 to about 35° C. and even more specifically 25° C.

The expression "conversion coating composition of the present invention" as used herein comprises a composition in which its presence of the conversion coating composition containing the water soluble dye can be determined on the surface of a substrate when applied at amounts equal to or greater than 5 mg/m$^2$ using the naked human eye or an optical method. Optical methods are any method using an optical instrument such as a light sensitive device or visible light detecting device. In one embodiment, light sensitive devices are such as a colorimeter, photoluminescent devices such as a fluorescent detector and a phosphorescent detector in which the substrate containing said composition is irradiated with radiant energy, which excites the organic water soluble dye to a higher electronic state and the emits excess energy to return to the ground electronic state, and therefore can be visible to the naked human eye.

The expression "visible to the naked human eye" as used herein is the visibility by the naked human eye of the presence of color, or absence thereof, on at least a portion of a substrate coated by the conversion coating composition, where the color has a wavelength of electromagnetic radiation that is detectable to the naked human eye. Electromagnetic radiation in this range of wavelengths is called visible light or simply light. As used herein, naked human eye will detect the presence of color or visible light having wavelengths of from about 390 to about 700 nm. In terms of frequency, this corresponds to a band in the vicinity of 430-790 THz.

The expression "optical instrumentation" as used herein is any light sensitive device or visible light detecting device as described herein.

The expression "water soluble" as used herein means a compound which when added to and mixed with distilled water at 25° C., forms a mixture having one-phase (a solution). In one embodiment, a water soluble dye is dye that forms a one-phase mixture with water, where the one-phase mixture contains greater than or equal to 0.0001 gram of dye per 100 grams of distilled water at 25° C., more specifically from 0.0001 gram to 100 grams of dye per 100 grams of distilled water at 25° C.

The expression "detectable" as used herein means that the naked human eye is able to identify that the surface of the metal containing a dye has a color that is different when compared to a metal surface that does not contain a dye and/or that an optical instrument detects an absorbance of light, wherein absorbance is a logarithmic ratio of the radiation falling upon a dye to the radiation transmitted through a dye at 25° C. and the radiation is in the range of from 390 to about 700 nm. In one embodiment, the absorbance is greater than or equal to 0.01.

The expression "intensity" as used herein means the difference in color between a metal surface containing an amount of dye and a metal surface that does not contain a dye, where when the naked human eye is used to detect the intensity, the difference is determined by matching the color of metal surface containing said amount of dye with standards which are metal surfaces containing known amounts of dye deposited on the surface of the metal surface, and when an optical instrument is used to detect the intensity, the optical instrument determines the difference in the total integral of the absorbance of the metal surface containing the dye from the total integral of absorbance of the metal surface not containing the dye (blank) in the wavelength radiation of from 390 to about 700 nm at 25° C. The amounts of dye on the metal surface standards is determined gravimetrically, where the weight of the metal substrate before coating the surface is subtracted from the weight of the metal substrate after coating the surface with a dye dissolved in distilled water and drying at 110° C. for 20 minutes, and then dividing that difference in weight by the area of the metal surface coated with the dye solution.

The term "uniformity" as used herein means difference in intensity of color in a predetermine area of metal surface coated with the conversion coating of the present invention with the intensity of color of a different predetermined area coated with the conversion coating of the present invention, where the predetermine areas being compared have the same area. In one embodiment, the predetermined area is from 1 millimeter squared to 1 meter squared, more specifically from 1 centimeter squared to 100 centimeters squared, and even more specifically 10 centimeters squared. In another embodiment, a metal surface coated with the conversion coating composition is uniform when the difference in intensity of color between two predetermined areas is less than 10 percent, more specifically, less than 1 percent, where the percent is determine by subtracting the intensity of color of the two predetermined areas, and then dividing the remainder by the average of the intensity of color of the two predetermined areas.

The expression "detrimental amounts of precipitates" as used herein comprises the formation of solids or liquids which do not form a stable suspension as described herein. Detrimental amounts of precipitate are amounts greater than about 1000 milligram of precipitate per kilogram of the conversion coating composition after storage for a period of at least 48 hours when stored at about 25° C., more specifically amount greater than about 100 milligram of precipitate per kilogram of the conversion coating composition and even more specifically greater than about 10 milligram of precipitate per kilogram of the conversion coating composition. In one embodiment, the amount of precipitate is determined gravimetrically. The gravimetric method involves filtering one kilogram of the conversion coating composition through a dried, pre-weighed absorbent filter pad with a pore size of 50 microns, drying said pad in an oven for 1 hour at 110° C. and measuring the weight gain. The difference between the pre-dried filter pad and the weight of the filter pad after filtration and drying is the amount of precipitate. A 50-micron absorbent filter pad is a porous material that has pores large enough to filter particles that are 50-microns in diameter or larger from the conversion coating composition.

The expression "thickness" as used herein means the weight of the dried conversion coating composition per area of coated surface. In one embodiment, the thickness is determined by constructing a calibration curve of intensity of color versus the thickness of dried conversion coating composition using a series of standards, where the intensity of color is determined using an optical instrument and the thickness is determined gravimetrical, where the weight difference between the weight of metal panel coated with the conversion coating composition and dried at 110° C. for 20 minutes and the weight of the metal panel before coating is divided by the area of the coated surface.

In one embodiment herein, the metal corrosion inhibitor (i) is a silicon-containing compound having the general formula (VI):

(VI)

wherein
X is a functional group of valence r, including mono-, di- or, polyvalent groups, wherein each occurrence of $R^1$ is independently a linear, branched or cyclic divalent organic group of up to 12 carbon atoms, more specifically up to about 10 carbon atoms, and most specifically from up to about 8 carbon atoms and optionally containing one or more heteroatoms, such as the non-limiting examples of O, N, P, Cl, Br, I and S, with the proviso that X and the silicon atom of the silyl group are bonded to the $R^1$ group through a covalent bond to a carbon atom of $R^1$, thereby forming a bridge between functional group X and the silyl group;
each occurrence of $R^2$ independently is alkyl, aryl, or aralkyl, each containing up to 16 carbon atoms, more specifically from up to about 12 carbon atoms and most specifically from up to about 8 carbon atoms;
each occurrence of $R^3$ independently is acetyl, alkyl, alkoxy-substituted alkyl or hydroxyl-substituted alkyl, all each containing up to about 16 carbon atoms, more specifically up to about 12 carbon atoms and most specifically up to about 8 carbon atoms or hydrogen;
r is an integer of from 1 to 4, more specifically 1 or 2 and most specifically 1; and
a is 0, 1 or 2, more specifically 0 or 1 and most specifically 0.

In one embodiment herein when the corrosion inhibitor (i) is a silicon-containing compound such as the non-limiting example of the silane of formula (VI), then the conversion coating composition further comprises a metal fluoride-containing compound. In one non-limiting example the metal fluoride-containing compound is at least one of a zirconate fluoride and a titanate fluoride.

The conversion coating herein comprises in one non-limiting embodiment one or more silicon-containing compounds that are organofunctional silanes or a hydrolyzate and/or partial or complete condensate thereof, such as the non-limiting example of ureidosilanes.

In one embodiment herein the phrase "organofunctional silane" is understood to be any alkoxysilane that in addition to its alkoxy functionality bonded to the silicon atom, the silane has an additional functional group that is bonded to the silicon atom through a hydrocarbon group, which optionally contains heteroatoms, with the proviso that the hydrocarbon group containing heteroatoms is bonded to the silicon through a carbon atom.

In one embodiment herein, it will be understood that ureidoalkoxysilane is a more specific embodiment of an organofunctional silane, which can be used in any embodiment herein. In one embodiment herein, in any of the compositions and/or methods described herein, ureidosilane can be, in one non-limiting embodiment, an organofunctional silane.

In one embodiment an organofunctional silane is an alkoxysilane and/or acyloxysilane that can be hydrolyzed with any water, specifically water present in any compositions and/or methods described herein to yield the presence of hydrolyzate and/or partial or complete condensate thereof in said compositions and/or methods. In yet another embodiment a hydrolyzate is the partial and/or completely hydrolyzed product of organofunctional silane. In another further embodiment, similar to the hydrolysis of organofunctional silane described herein, hydrolyzate can be subject to a condensation reaction that can involve condensation reactions known to those skilled in the art that can yield partially and/or completely condensed hydrolyzates. In another embodiment herein, the level of hydrolysis of the herein described organofunctional silane can be the amount that occurs instantly upon exposure of the silane to moisture up to complete hydrolysis of the organofunctional silane.

Non-limiting examples of $R^1$ are methylene, ethylene, propylene, isopropylene, butylene, isobutylene, cyclohexylene, arylene and alkarylene groups.

In one embodiment X is a functional group, such as the non-limiting examples of mercapto, acyloxy, glycidoxy, epoxy, epoxycyclohexyl, epoxycyclohexylethyl, hydroxy, episulfide, acrylate, methacrylate, ureido, thioureido, vinyl, allyl, thiocarbamate, dithiocarbamate, ether, thioether, disulfide, trisulfide, tetrasulfide, pentasulfide, hexasulfide, polysulfide, xanthate, trithiocarbonate, dithiocarbonate, cyanurato, isocyanurato, —NHC(=O)$OR^2$ or —NHC(=O)$SR^2$ where $R^2$ is alkyl, aryl, or aralkyl, each containing up to 16 carbon atoms, more specifically from up to about 12 carbon atoms and even most specifically from up to about 8 carbon.

In one embodiment the set of univalent functional groups X herein includes, but is not limited to, mercapto; acyloxy, such as acryloxy, methacryloxy, and acetoxy; glycidoxy, —O—$CH_2$—$C_2H_3O$; epoxycyclohexylethyl, —$CH_2$—$CH_2$—$C_6H_9O$; epoxycyclohexyl, —$C_6H_9O$; epoxy, —CR(—O—)$CR_2$; hydroxy; carbamate, —NR(C=O)OR; urethane, —O(C=O)NRR; univalent ureido —NR(C=O)$NR_2$; silyl, —Si$(R^2)_a(OR^3)_{3-a}$; where $R^2$, $R^3$ and a are as defined; silylalkyl, —$C_6H_9(C_2H_4Si(R^2)_a(OR^3)_{3-a})_2$, where a is as defined, wherein $C_6H_9$ refers to cyclohexyl; and univalent isocyanurato (—N)(NR)(NR)$C_3O_3$, where each occurrence of R is independently selected from the group consisting of hydrogen, alkyl of from 1 to about 6 carbon atoms, cycloalkyl of from 3 to about 10 carbon atoms, alkenyl of from 2 to about 6 carbon atoms, arylene of from 6 to about 10 carbon atoms or alkarylene of from 7 to about 12 carbon atoms.

In another embodiment herein the set of divalent functional groups X herein includes, but is not limited to, carbamate, -(-)N(C=O)OR; ureido —NR(C=O)NR—; and divalent isocyanurato, (—N)$_2$(NR)$C_3O_3$ where R is independently selected from the group of hydrogen, alkyl of from 1 to about 6 carbon atoms, cycloalkyl of from 3 to about 10 carbon atoms, alkenyl of from 2 to about 6 carbon atoms, arylene of from 6 to about 10 or alkarylene from 7 to about 12 carbon atoms.

In yet another embodiment herein, the set of trivalent functional groups X herein includes, but is not limited to, carbamate, (-)$_2$NC(=O)O—; ureido, (-)$_2$NC(=O)NR—, and trivalent isocyanurato (—N)$_3C_3O_3$, wherein each occurrence of R is independently selected from the group consisting of hydrogen, alkyl of from 1 to about 6 carbon atoms, cycloalkyl of from 3 to about 10 carbon atoms, alkenyl of from 2 to about 6 carbon atoms, arylene of 6 to about 10 carbon atoms, or alkarylene of 7 to about 12 carbon atoms.

In a further embodiment herein, the set of tetravalent functional groups X herein includes, but is not limited to ureido, (-)$_2$N(C=O)N(-)$_2$.

In a specific embodiment the organofunctional silane is univalent ureido —NR(C=O)$NR_2$, divalent ureido —NR(C=O)NR— and (-)$_2$N(C=O)$NR_2$; trivalent ureido (-)$_2$NC(=O)NR—; tetravalent ureido (-)$_2$N(C=O)N(-)$_2$ and trivalent isocyanurato (—N)$_3C_3O_3$ where R is independently selected from the group of hydrogen, alkyl of from 1 to about 6 carbon atoms, cycloalkyl of from 3 to about 10 carbon atoms, alkenyl of from 2 to about 6 carbon atoms, arylene of from 6 to about 10 or alkarylene from 7 to about 12 carbon atoms.

In a specific embodiment r is an integer of from 1 to 4, more specifically from 1 to 2, and even more specifically 1.

In one embodiment metal corrosion inhibitot (i) is an ureidoalkoxysilane such as the non-limiting example of ureidoalkoxysilane described herein. In one more specific embodiment herein, as to the ureido silane (such as the non-limiting example of ureidoalkoxysilane described herein) materials that are present and can be used, these include ureido silanes as set forth in formula (VII):

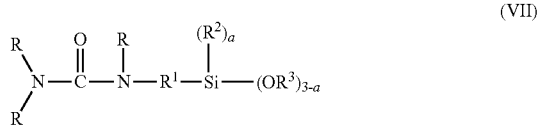

(VII)

wherein
each occurrence of R independently is hydrogen, alkyl of from 1 to 6 carbon atoms, cycloalkyl of from 3 to about 6 carbon atoms, alkenyl of from 2 to about 6 carbon atoms, arylene of from 6 to about 10 carbon atoms or alkarylene of from 7 to about 12 carbon atoms, and specifically the R which is bound to the nitrogen atom that is a bridge between the carbonyl and $R^1$, is individually selected from the group consisting of hydrogen, methyl, ethyl, propyl, iso-propyl, butyl, iso-butyl, sec-butyl, tert-butyl, and cyclohexyl;

$R^1$ is a divalent substituted or unsubstituted aliphatic or aromatic group of up to 12 carbon atoms, specifically $R^1$ is selected from the members of the group consisting of an alkylene of from 1 to about 10 carbon atoms, alkenylene of from 2 to about 6 carbon atoms, arylene of from 6 to about 10 carbon atoms and alkylarylene of from 7 to about 12 carbon atoms; and more specifically, $R^1$ is independently methylene, ethylene, propylene, 2-methylpropylene or 2,2-dimethylbutylene;

each $R^2$ independently is a monovalent hydrocarbon group of from 1 to about 10 carbon atoms, even more specifically 1 to about 6 carbon atoms, and yet even more specifically such as the non-limiting examples of alkyl, aryl and aralkyl groups such as the non-limiting examples of methyl, ethyl, butyl, hexyl, phenyl, or benzyl, more specifically, the lower alkyls of from 1 to about 4 carbon atoms and most specifically methyl;

each $R^3$ is independently chosen from the group consisting of hydrogen, linear or branched alkyl, linear or branched alkoxy-substituted alkyl, linear or branched acyl of up to about 16 carbon atoms, specifically $R^3$ is individually chosen from the group consisting of hydrogen, ethyl, methyl, propyl, iso-propyl, butyl, iso-butyl, sec-butyl and acetyl; and in one embodiment, at least one $R^3$ is other than hydrogen or acetyl; and a is 0, 1 or 2.

In an embodiment, it will be understood herein that as used herein, the term "substituted" aliphatic or aromatic means an aliphatic or aromatic group wherein the carbon backbone may have a heteroatom located within the backbone, or a heteroatom attached to the carbon backbone, or a heteroatom containing group attached to the carbon backbone. In one embodiment some non-limiting examples of a heteroatom are oxygen, nitrogen or combinations thereof.

In one other more specific embodiment herein, ureido silane (such as the non-limiting example of ureidoalkoxysilane) employed in this disclosure is gamma-ureidopropyltrimethoxysilane such as one having the structure (VIII):

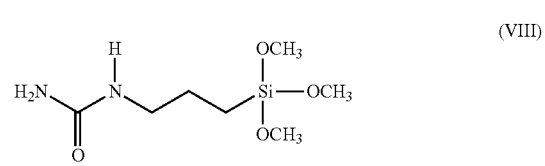 [SMILES: CO[Si](CCCNC(N)=O)(OC)OC]

(VIII)

which can also be used to prepare the hydrolyzate(s) and/or partial or complete condensate thereof, which can be used in the compositions and methods described herein In another specific embodiment one non-limiting example of ureido silane herein can be 3-ureidopropyltriethoxysilane which can also be used to prepare the hydrolyzates and/or partial or complete condensate thereof, which can be used in the compositions and methods described herein. Pure 3-ureidopropyltriethoxysilane is a waxy solid material. A solvent or means of solubilizing the solid material is needed for it to be useful. In one specific embodiment herein, commercially available 3-ureidopropyltriethoxysilane is dissolved in the non-limiting example of methanol, and as a result, it is not a pure compound but contains both methoxy and ethoxy groups attached to the same silicon atom. In one embodiment commercially available 3-ureidopropyltriethoxysilane is dissolved in methanol so that methanol makes up 50 weight percent solution of the solution of ureidopropyltrialkoxysilane and methanol. In another specific embodiment herein, when fully hydrolyzed, the identity of the silanes would be identical.

In one embodiment herein metal corrosion inhibitor (i) is selected from the group consisting of vinylmethyldiethoxysilane, vinyltrimethoxysilane, vinyldimethylethoxysilane, vinyltriethoxysilane, vinyltripropoxysilane, vinyl-tris(2-methoxyethoxysilane), styrylethyltrimethoxysilane, gamma-acryloxypropyltrimethoxysilane, gamma-(acryloxypropyl)methyldimethoxysilane, gamma-methacryloxypropyltrimethoxysilane, gamma-methacryloxypropyltriethoxysilane, gamma-methacryloxypropylmethyldimethoxysilane, gamma-methacryloxypropylmethyldiethoxysilane, gamma-methacryloxypropyl-tris-(2-methoxyethoxy)silane, beta-(3,4-epoxycyclohexyl)ethyltrimethoxysilane, beta-(3,4-epoxycyclohexyl)ethyltriethoxysilane, gamma-glycidoxypropyltrimethoxysilane, gamma-glycidoxypropyltriethoxysilane, gamma-glycidoxypropylmethyldiethoxysilane, gamma-glycidoxypropylmethyldimethoxysilane, gamma-mercaptopropyltrimethoxysilane, gamma-mercaptopropyltriethoxysilane, gamma-thiooctanoylpropyltrimethoxysilane, gamma-thiooctanoylpropyltriethoxysilane, bis-(trimethoxysilylpropyl)tetrasulfane, bis-(triethoxysilylpropyl)disulfane, gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, gamma-carbamatopropyltrimethoxysilane, gamma-carbamatopropyltriethoxysilane, isocyanurate propyltrimethoxysilane, bis-(trimethoxysilylpropyl)urea, bis-(triethoxysilylpropyl)urea, 2-cyanoethyltrimethoxysilane, 2-cyanoethyltriethoxysilane and combinations thereof.

In one specific embodiment metal corrosion inhibitor (i) is selected from the group consisting of gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, N,N'-bis-(3-triethoxysilylpropyl)urea, N,N'-bis-(3-trimethoxysilylpropyl)urea, N,N'-bis-(3-diethoxymethylsilylpropyl)urea, N,N'-bis-(3-diisopropoxymethylsilylpropyl)urea, N,N-bis-(3-triethoxysilylpropyl)urea, N,N-bis-(3-trimethoxysilylpropyl)urea, N,N-bis-(3-diethoxymethylsilylpropyl)urea, N,N-bis-(3-diisopropoxymethylsilylpropyl)urea, N,N,N'-tris-(3-triethoxysilylpropyl)urea, N,N,N'-tris-(3-trimethoxysilylpropyl)urea, N,N,N'-tris-(3-diethoxymethylsilylpropyl)urea, N,N,N'-tris-(3-diisopropoxysilylpropyl)urea, N,N,N,'N'-tetrakis-(3-triethoxysilylpropyl)urea, N,N,N,'N'-tetrakis-(3-trimethoxysilylpropyl)urea, N,N,N,'N'-tetrakis-(3-diethoxymethylsilylpropyl)urea, N,N,N,'N'-tetrakis-(3-diisopropoxymethylsilylpropyl)urea, tris-(3-trimethoxysilylpropyl)isocyanurate, and combinations thereof.

In one specific embodiment metal-corrosion inhibitor (i) is selected from the group consisting of gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane and combinations thereof.

In one other embodiment herein the stable suspension herein can be substantially free of hazardous air pollutant. The phrase "substantially free of hazardous air pollutant" (HAP or HAPs) is a level of HAP that is present after a removal of HAP from the aqueous solution of hydrolyzate or partial and/or complete condensate of organofunctional silane, tetraalkoxyzirconate and/or tetraalkoxytitanate described above, more specifically a removal that results in a lower level of HAP compared to an equivalent aqueous solution of hydrolyzate or partial and/or complete condensate of organofunctional silane, tetraalkoxyzirconate and/or tetraalkoxytitanate that has not had HAP removed. In one specific embodiment, such a removal of HAP can be accomplished through sparging with an inert gas such as the non-limiting example of nitrogen. In one more specific embodiment such sparging can be conducted for a period of from about 2 to about 96 hours, more specifically of from about 4 to about 72 hours, even more specifically of from about 6 to about 48 hours and most specifically of from about 8 to about 24 hours. In another embodiment herein some other techniques that can be used herein for the removal of HAP are reduced pressure and/or distillation.

In one even more specific embodiment hazardous air pollutants comprise a level of HAPs of specifically less than about 1 weight percent, more specifically less than about 0.2 weight percent, even more specifically less than about 0.05 weight percent and most specifically less than about 0.01weight percent, said weight percents being based on the total weight of the detectable composition.

In one specific embodiment herein HAPs are any compounds used in paints that have been identified as HAPs in the Clean Air Act Amendments of 1990 of the United States of America. In one specific embodiment HAPs can be byproducts formed from the hydrolysis of organofunctional silane (a) described above. In one specific embodiment HAPs includes acetamide, acrylamide, acrylic acid, acrylonitrile, allyl chloride, aniline, benzene, 1, 3-butadiene, caprolactam, catechol, cumene, 1,2-dichloroethane, dichloroethyl ether, diethanolamine, dimethylamino-azobenzene, dimethylfomamide, dimethylphthalate, epichlorohydrin, ethyl acrylate, ethyl benzene, ethylene dibromide, ethylenimine, formaldehyde, hexachlorabenzene, n-hexane, hydroquinone, isophorone, maleic anhydride, methanol, methyl ethyl ketone, methyl isobutyl ketone, methylene chloride, naphthalene, nitrobenzene, 2-nitropropane, pentachlorophenol, phenol, propylene oxide, styrene, 1,1,2,2-tetrachloroethane, toluene, 2,4-toluene diisocyanate, 1,1,1-trichloroethane, trichloroethylene, 2,4,6-trichlorophenol, vinyl acetate, vinyl chloride, xylenes, m-xylene, o-xylene, p-xylene and combinations thereof. An example is the release of methanol from the hydrolysis of gamma-ureidopropyltrimethoxysilane.

In another specific embodiment in addition to being substantially free of HAPs or containing levels of HAPs of specifically less than about 1 weight percent, more specifically less than about 0.2 weight percent, even more specifically less than about 0.05 weight percent and most specifically less than about 0.01 weight percent, said weight percents being based on the total weight of the detectable composition, the detectable composition herein can further be low in volatile organic compound (VOC). In one specific embodiment VOC can be byproducts formed from the hydrolysis of organofunctional silane, tetraalkoxyzirconate and/or tetraalkoxytitanate described above. In one more specific embodiment VOC is any organic compound which participates in any atmospheric photochemical reactions; that is any organic compound other than those, which the Environmental Protection Agency of the United States of America (EPA) designates as having negligible photochemical reactivity. In a more specific embodiment VOC can be selected from the group consisting of methanol, ethanol, n-propanol, 2-propanol, n-butanol, 2-butanol, tert-butanol and combinations thereof. In a further embodiment herein, low in VOC is a level of VOC of specifically less than about 10 weight percent, more specifically less than about 5 weight percent, even more specifically less than about 2 weight percent and most specifically less than about 1 weight percent, said weight percents being based on the total weight of the composition.

In the application of coatings, such as in the application of coatings to metal surfaces, VOC is calculated according EPA Method 24 from percent non-volatile, with corrections on exempt solvents and water. The non-volatile content is measured based on ASTM Standards D2369 and D3960. In one embodiment, generally, a weighed sample of material is placed in a weighed dish and placed in a convection oven at 110° C. for 1 hour. The weight remaining in the dish is then determined. The amount of VOC can then be calculated by subtracting the weight remaining in the dish from the sum of the weight of sample and the weight of the dish. The percent VOC is calculated by dividing the remainder of the weight determined above by the weight of the sample and multiplying the quotient by 100%. In one embodiment, glycols which are more specific to applications, which exhibit low VOC besides the others described herein are 1,4-cyclohexanedimethanol, trimethylolpropane, glycerol, pentaerythritol and combinations thereof.

In one embodiment herein the metal fluoride-containing compound (iv) used with the silicon-containing compound is a dissolved fluorometallate anion, more specifically selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$ and mixtures thereof, with the first two being more preferred and fluorozirconate being the most preferred. Such anions may be introduced into a conversion coating according to the invention as acids or salts, with the acids usually preferred for economy and because a net acidity of the conversion coating is preferable, and the entire stoichiometric equivalent as any of the above recited fluorometallate ions in any source material as dissolved in a conversion coating according to the invention or a precursor composition for it is to be considered as part of the metal fluoride-containing component, irrespective of the actual degree of ionization that may occur. The cation of the metal-containing compound is selected from the group consisting of hydrogen, ammounium ion, alkali and alkaline metal cations. In another embodiment, the metal fluoride-containing compounds (iv) can be alkali or alkaline metal salts of fluoride. Independently of their chemical nature, the total amount of the metal fluoride-containing compound in the conversion coating composition is at least 0.001 weight percent, more specially from 0.001 weight percent to 10 weight percent, even more specially from 0.01 weight percent to 5 weight percent, and still more specially from 0.1 weight percent to 1 weight percent, based on the total weight of the conversion coating composition.

In one embodiment herein the colloidal metal oxide is selected from the group consisting of aluminum oxide, cerium oxide, silica, titania, zirconium oxide and combinations thereof. The silica can be a silica sol material such as aqueous colloidal silica, specifically with acidic pH. Some non-limiting examples of silica sol materials are those that may be purchased from Cabot Corporation and from other suppliers such as Wacker Chemie, Degussa, Nissan Chemical, and Nalco Chemical Company. One specific non-limiting example of an effective silica sol, Cab-O-Sperse A205, is an aqueous dispersion of high purity fumed silica in deionized water available from Cabot Corporation. Cab-O-Sperse A205 has a pH of about 5-7, a solids content of about 12%, a viscosity of less than 100 centipoise (cPs) and a specific gravity of about 1.07. In one embodiment herein a colloidal metal oxide is understood to include silica. In one embodiment colloidal metal oxide is cerium oxide.

In one embodiment herein, cerium oxide can be cerium oxide sols which are commercially available. In one specific embodiment cerium oxide sols that are commercially available, comprise cerium oxide particles in aqueous colloidal suspension. In one more specific embodiment herein some non-limiting commercially available cerium oxide sols that may be mentioned as exemplary include colloidal cerium oxide nitrate and cerium oxide acetate, both available from Rhodia and as well as those cerium oxide sols available from Nyacol Nano Technologies Inc. In one more specific embodiment herein, cerium oxide acetate sol includes 20 weight percent cerium oxide particles. In yet another specific embodiment, some non-limiting exemplary cerium oxide sols includes those having particle sizes of less than about 100 nanometers (nm), more specifically less than about 50 nm and most specifically less than about 20 nm. In another specific embodiment some non-limiting exemplary pHs of cerium oxide sols, are those having pH values of on the order of from 1 to about 9, more specifically, of from 1 to about 6 and most specifically of from 2 to about 4. In yet a more specific embodiment some other non-limiting examples of other metal oxides, e.g., metal oxide sols, include those such as ZnO, $ZrO_2$, $TiO_2$, $Al_2O_3$ and combinations thereof.

In one more specific embodiment the stable suspension comprising colloidal metal oxide can comprise colloidal metal oxide in an amount of specifically of from about 0.001 to about 36 weight percent, more specifically of from about 0.01 to about 30 weight percent, and most specifically of from about 0.1 to about 20 weight percent, said weight percents being based on the total weight of the stable suspension. In yet another embodiment herein, colloidal metal oxide can further comprise silica, and more specifically silica sol.

In one embodiment herein, a more specific colloidal cerium oxide may be sourced from Nyacol Nano Technologies, and has the following characteristics:

|  | $CeO_2$ ACT |
|---|---|
| $CeO_2$ (wt. %) | 20 |
| Particle Size (nm) | 10-20 |
| Particle Charge | Positive |
| pH | 3.0 |
| Specific Gravity | 1.22 |

|  | CeO₂ ACT |
| --- | --- |
| Viscosity | 10 |
| Counter Ion (mol/mol) | 0.4 Acetate |

Further, the water soluble dye (iii) is such that it has the various parameters described herein to make it compatible with the conversion coating. The dye (iii) used herein can be a fluorescing dye or merely a visible dye. It will be understood that a fluorescing dye may still be visible to the naked human eye, but a visible dye will be such that it does not contain fluorescing components.

In one embodiment herein the water soluble dye (iii) is a visible dye, it is such that it may have a characteristic color under visible light which is visibly detectable by the naked human eye in a coating of the desired thickness on a substrate, such as a metal surface of a metal substrate. This would allow a qualitative determination of whether the coating is present on the substrate along with the ability to quantify the thickness of the coating according to the methods of the invention herein.

If the water soluble dye (iii) is a fluorescing dye, it will be such that it produces a detectable fluorescence even when small amounts of the dye are used in the stable suspension or where the stable suspension (the coating composition) is very thin. The wavelength of light which causes the dye to fluoresce should be different from (i.e., must not overlap with) the wavelength of light emitted from the dye when it fluoresces. This ensures that there is no undue interference with the measurement of the intensity of the fluorescence by the light used to cause the dye to fluoresce.

Another parameter for the water soluble dye (iii) is that the dye will not
interfere with the conversion coating, e.g., will not form precipitates or result in gelation of the suspension at 25° C. temperature for a period of at least about 48 hours, more specifically, for a period of about 48 hours to at least about 18 months and furthermore, will not result in chemical reaction with the conversion coating or with the metal surface. In one embodiment, the water soluble dye (iii) is an organic compound and will not result in destabilization of the colloidal metal oxide aqueous colloidal suspension (e.g., cerium oxide aqueous colloidal suspension) i.e., it is a stable suspension. In one embodiment, the water soluble dye (iii) is such that it has an acetate counterion. In another embodiment herein the water soluble organic dye (iii) is stable, i.e., the definition of stable as used herein comprises water soluble dye in the conversion coating composition exhibiting little or no change in physical appearance in the composition, such as visible sedimentation or gelling for a period of at least 2 days of continuous, undisturbed storage at a temperature of from about 10 to about 70° C., and more specifically, at a temperature of from about 15 to about 35° C. and even more specifically 25° C. The water soluble dye is such that it does not result in precipitation of the colloidal metal oxide in the detectable composition.

Yet another parameter of the water soluble dye would be that its use in the conversion coating provides for a conversion coating which deposits on the substrate with at least the same uniformity as a conversion coating which does not contain the dye. This uniformity of coating can in one embodiment be determined by visible inspection by the naked human eye.

One other parameter of the water soluble dye (iii) would be that when used in the conversion coating, the dye provides for qualitative characterization of the conversion coating uniformity and thickness by the naked human eye and/or quantitative characterization of the conversion coating uniformity and thickness by the naked human eye using a series of standards.

In one embodiment, the water soluble dye (iii) should be present in the conversion coating in an amount of less than about 1000 ppm, more specifically less than about 750 ppm, even more specifically less than about 500 ppm and most specifically less than about 100 ppm, wherein in one embodiment each of the aforementioned ranges can have a lower endpoint of any one of 1 ppm, 5 ppm, 10 ppm, or 25 ppm.

One other parameter of the water soluble dye (iii) would be that when used in the conversion coating, the dye provides for the same physical, mechanical and corrosion properties as an identical conversion coating which does not contain the dye. Some of the suitable physical, mechanical and corrosion properties are those of pre-treated hot-dipped galvanized or Al test panels topcoated with powder or liquid coatings (such as the conversion coating described herein) measured by test methods including but not limited to an impact resistance test as per EN ISO 6272, or an Erichsen cupping test as per EN ISO 1520 or a corrosion resistance test as per: EN ISO 7253.

In one non-limiting embodiment herein, the application method of the dye (iii) described in this invention requires the conversion coating to be rinsed with water after application and before inspection. In addition application of the target dye (e.g., Fluorescent Brightener 363) allows one to see with the naked human eye how the coating weight increases with the dwell time in the organofunctionalsilane/zirconate bath such as is demonstrated in FIG. 1.

In one specific non-limiting embodiment, the water soluble dye (iii) has a positive charge and counterion derived from a carboxylic acid containing from 1 to about 6 carbon atoms, more specifically from 1 to about 3 carbon atoms, such as the non-limiting examples of formic acid, acetic acid and the like.

In one non-limiting embodiment, the dye (iii) is a water soluble dye having the general formulae (I):

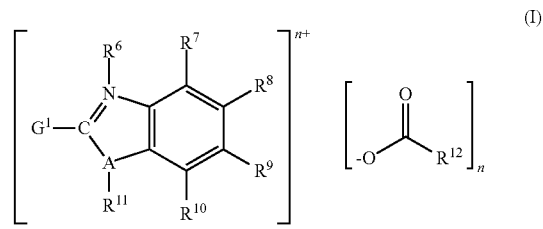

wherein:
  G¹ is an organic group having from 1 to about 20 carbon atoms and containing at least one oxygen or nitrogen heteroatom;
  A is a nitrogen atom or (-)₃C—R*, where R* is a monovalent group chosen from alkyl, cycloalkyl, alkenyl, aralkyl or aryl group having up to about 10 carbon atoms;
  R⁶ is an alkyl, a hydroxylalkyl, an alkoxyalkyl, a cycloalkyl, an aralkyl optionally substituted with a halogen or alkoxy group, an aryl optionally substituted with a halogen or alkoxy group, a cyanoalkyl, a carbamatoalkyl or a carboalkoxyalkyl group containing up to about 10 carbon atoms, or hydrogen;

$R^7$ is an alkyl, alkoxy, aryl alkylsulfonyl, or arylsulfonyl group containing up to about 10 carbon atoms or hydrogen;

$R^8$ is an alkyl, alkoxy, aryl alkylsulfonyl, arylsulfonyl, or aminosulfonyl group containing up to about 10 carbon atoms or hydrogen;

$R^9$ is an alkyl, alkoxy, aryl alkylsulfonyl, or arylsulfonyl group containing up to about 10 carbon atoms or hydrogen;

$R^{10}$ is an alkyl, alkoxy, aryl alkylsulfonyl, or arylsulfonyl group containing up to about 10 carbon atoms or hydrogen;

$R^{11}$ is an alkyl, a hydroxylalkyl, an alkoxyalkyl, cycloalkyl, an aralkyl optionally substituted with a halogen or alkoxy group, an aryl optionally substituted with a halogen or alkoxy group, a cyanoalkyl, a carbamatoalkyl or an alkoxycarbonylalkyl group containing up to about 10 carbon atoms or hydrogen;

$R^{12}$ is an alkyl group containing from 1 to about 6 carbon atoms or hydrogen; and n is an integer of from 1 to 3, more specifically 1 or 2, and most specifically 1.

In one embodiment, $G^1$ is a monovalent organic group of the general formula (IX):

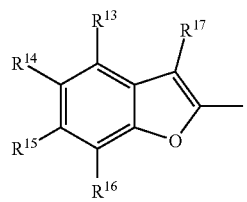

wherein:
$R^{13}$ is an alkyl or alkoxy group containing from 1 to about 6 carbon atoms, halogen, hydrogen or together with $R^{14}$ forms a fused aryl group containing up to 16 carbon atoms, or a ring containing a —O—CH$_2$—O— group or —O—CH$_2$CH$_2$—O— group bonded to the aromatic ring of the structure (IX) which contains up to 16 carbon atoms;

$R^{14}$ is an alkyl or alkoxy group containing from 1 to 6 carbon atoms, hydrogen, halogen, carboxyl, carboalkoxy, aminocarbonyl, carbamato, sulfonyl, alkylsulfonyl, aminosulfonyl or together with $R^{13}$ or $R^{15}$ forms a fused aryl group containing up to about 16 carbon atoms, or a ring containing a —O—CH$_2$—O— group or —O—CH$_2$CH$_2$—O— group bonded to the aromatic ring of the structure (IX) which contains up to 16 carbon atoms;

$R^{15}$ is an alkyl or alkoxy group of from 1 to about 6 carbon atoms, a halogen or a hydrogen or together with $R^{14}$ or $R^{16}$ forms a fused aryl group containing up to about 16 carbon atoms, or together with $R^{14}$ or $R^{16}$ forms a fused ring containing a —O—CH$_2$—O— group or —O—CH$_2$CH$_2$—O— group bonded to the aromatic ring of the structure (IX) which contains up to about 16 carbon atoms, or a monovalent group of from 2 to about 12 carbon atoms derived from 2H-[1,2,3]triazole;

$R^{16}$ is an alkyl or alkoxy group of from 1 to about 6 carbon atoms, a halogen or hydrogen or together with $R^{15}$ forms a fused aryl group containing up to 16 carbon atoms, or a ring containing a —O—CH$_2$—O— group or —O—CH$_2$CH$_2$—O— group bonded to the aromatic ring of the structure (IX) which contains up to about 16 carbon atoms; and $R^{17}$ is an alkyl group of from 1 to about 6 carbon atoms, hydrogen, or a phenyl group which is optionally substituted with an alkyl or alkoxy group of up to about 8 carbon atoms.

In another embodiment, $G^1$ is a monovalent organic group of the general formula (X):

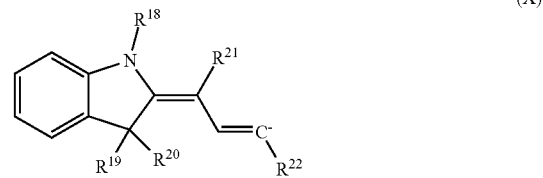

wherein:
each $R^{18}$, $R^{19}$, $R^{20}$, $R^{21}$ and $R^{22}$ is independently an alkyl group of from 1 to about 6 carbon atoms or hydrogen.

In one embodiment, the water soluble organic dye (iii) of chemical formula(X) has A equal to —CR* and $G^1$ is the group of formula (X).

In another embodiment, the water soluble organic dye (iii) of chemical Formula (X) has A equal to —CR* and $G^1$ is the group of formula (X), where $R^{18}$, $R^{19}$ and $R^{20}$ are each methyl and $R^{21}$ and $R^{22}$ are each hydrogen.

In another embodiment, the water soluble dye (iii) of chemical formula (X) has A is a nitrogen atom and $G^1$ is the group of formula (X).

In another non-limiting embodiment, the water soluble dye (iii) has the general formulae (II):

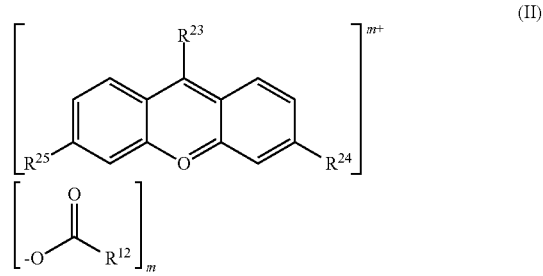

wherein:
$R^{12}$ is an alkyl group containing from 1 to about 6 carbon atoms or hydrogen;

$R^{23}$ is hydrogen, an alkyl group of from 1 to about 6 carbon atoms, an aryl group of from 6 to about 10 carbon atoms, an aralkyl group of from 7 to about 12 carbon atoms or an aryl group of from 6 to about 12 carbon atoms substituted with a hydroxycarbonyl group (—C(=O)OH) or an alkoxycarbonyl group (—C(=O)OR$^{26}$), where $R^{26}$ is an alkyl group of from 1 to about 4 carbon atoms;

$R^{24}$ is hydrogen, an alkyl group containing 1 to about 6 carbon atoms, hydroxyl or amino having the structure —NR$^{27}$R$^{28}$, where $R^{27}$ and $R^{28}$ are each independently a hydrogen or alkyl group of from 1 to about 6 carbon atoms;

$R^{25}$ is hydrogen, an alkyl group containing 1 to about 6 carbon atoms, hydroxyl or amino having the structure —NR$^{27}$R$^{28}$, where R$^{27}$ and R$^{28}$ are each independently a hydrogen or alkyl group of from 1 to about 6 carbon atoms; and m is an integer from 1 to 3, more specially 1 or 2, and most specifically 1.

In still another embodiment, the water soluble dye (iii) of formula (II) has R$^{24}$ and R$^{25}$ equal to —NR$^{27}$R$^{28}$, where each R$^{27}$ and R$^{28}$ is independently a hydrogen or an alkyl group of from 1 to about 3 carbon atoms and R$^{23}$ is C$_6$H$_4$—CO$_2$H.

In one further embodiment herein the water soluble dye (iii) is derived from xanthenylium, 1H-benzoimidazole, 3H-indole, 2-allylidene-2,3-dihydro-1H-indole and/or benzofuran.

In one embodiment the water soluble dye (iii) is a benzimidazole dye. Benzimidazolone dyes in this disclosure are of the azo-benzimidazolone class of organic pigments, which are generally derived from a substituted aromatic amine as the diazoniimi salt precursor (or, diazo component) and a coupling agent that contains a benzimidazolone functional moiety. Azo-benzimidazolone pigments are known to provide colors with hues ranging from yellow to red to brownish-red, depending primarily upon the chemical composition of the coupling component. Some non-limiting examples of benzimidazolone dyes are benzimidazolone yellow, benzimidazolone orange, or benzimidazolone red. In one embodiment herein the dye is a fluorescent dye, a benzimidazolne dye or mixtures thereof.

In another embodiment herein, the water soluble dye (iii) used herein can be selected from the group consisting of Amezine Rhodamine B Liquid, Amezine Brilliant R Red P Liquid, Amewhite BAC Liquid, available from American Dyestuff Corporation, and combinations thereof.

In one non-limiting embodiment herein, the water soluble dye (iii) can be other than pyranin-type UV dye-tracers and/or Rhodamine WT-type UV dye-tracers.

In a further embodiment herein the water soluble dye (iii) can be selected from fluorescent brightener 363, identified by CAS No.: 95078-19-6. In a further embodiment herein the water soluble dye (a) can be selected from fluorescent brightener 363, identified by CAS No.: 95078-19-6; Amewhite BAC liquid, Amezine Rhodamine B Liquid Dye or Amezine Brilliant R Red P Liquid and mixtures thereof.

It will be understood herein that in one embodiment herein any description of the water soluble dye (iii) is such that when the conversion coating composition is applied to a metal surface, the dye is visible to the naked eye and/or its presence is detectable and its intensity is measurable by optical instrumentation In one embodiment, water (ii) is specifically deionized water.

In one embodiment herein the conversion coating is chrome-free and/or phosphate free. In yet another embodiment herein the conversion coating is resistant to water washing.

In one embodiment the conversion coating herein can exhibit a period of stability which is at least about twice, more specifically at least about 3 times, and most specifically at least about 5 times that of an equivalent conversion coating in which water soluble dye (iii) is replaced with a water soluble organic dye which is other than the water soluble organic dye (iii). In one embodiment herein the conversion coating can have a period of stability of specifically for at least about 48 hours, more specifically from about 48 hours to about 5 years, even more specifically from about 72 hours to about 3 years, still even more specifically of from about 96 hours to about 2 years, and most specifically of from about 1 week to about 18 months, at a temperature of 25° C.

In another specific embodiment, in addition to the metal corrosion inhibitor (i), water (ii), water soluble dye (iii), and optional additives such as colloidal metal oxide of the conversion coating described herein, the shelf-life of the combination can be markedly improved by the optional addition of a stabilizing agent thereto. In one specific embodiment, with the addition of certain stabilizers, the shelf life of the conversion coating can be extended.

In one other embodiment herein the phrase "stabilizing agent" as used herein shall be understood to be a substance which is (1) soluble in water, (2) not a hazardous air pollutant and optionally additionally not a VOC and (3) retards precipitation or gelation of the metal-containing compound (b) or other components in the conversion coating composition.

In another embodiment herein the solubility of the stabilizing agent in water is such that there is at least no visible phase separation resulting from the formation of at least two distinct layers of the stabilizing agent and the aqueous composition and that stabilizing agent is able to retard precipitation or gelation in the composition as a result of using the specific stabilizing agent at the specifically used amount. In a more specific embodiment the stabilizing agent can have a solubility in water of specifically from complete miscibility to about 1 weight percent, more specifically from about 50 to about 2 weight percent and most specifically from about 30 to about 1 weight percent, said weight percents being based on the total weight of the composition.

In yet an even further embodiment herein the retardation of the precipitation or gelation of the metal corrosion inhibitor (i), such as an organofunctional silane, hydrolyzate and/or condensate thereof, can comprise eliminating any visible precipitation or gelation for a period of time from the composition as compared to an equivalent composition except for said stabilizing agent that would have said precipitation or gelation within the same time period.

In another specific embodiment, a host of stabilizing agents may be mentioned as exemplary. In one embodiment herein, some non-limiting examples of stabilizing agents include, for example alcohols, glycols, triols, polyols, glycol ethers, esters, ketones, pyrrolidones, or polyethersilanes and combinations thereof, and as indicated above, provided that stabilizing agent is limited to materials that are not HAPs.

In a more specific embodiment the above described polyether silane is at least one of the general formulae R$^6$O(EO)$_{7.5}$—CH$_2$—CH$_2$—CH$_2$—Si—(OMe)$_3$, or R$^6$O (EO)$_3$—CH$_2$—CH$_2$—CH$_2$—Si—(OMe)$_3$ where (EO) is as defined, R$^6$ is methyl and (OMe) is a methoxy group. In another embodiment herein any one or more of the herein described stabilizing agents can be used in any of the compositions and/or methods described herein.

In one embodiment polyether silane is of the general formula R$^6$O(EO)$_m$—[CH$_2$]$_n$—Si—(OR)$_3$ where m is 1 to about 20, n is 1 to about 12 and R and R$^6$ are each independently a linear, branched or cyclic organic group of 1 to about 16 carbon atoms, more specifically of 1 to about 12 carbon atoms and most specifically of 1 to about 8 carbon atoms and EO is an oxyethlyene group.

In a more specific embodiment herein, some non-limiting examples of specific stabilizers include wherein stabilizing agent is selected from the group consisting of ethanol, 1-propanol, 2-propanol, 2-methyl-1-propanol, 2-methyl-2-propanol, 1-butanol, 2-butanol, 2-methyl-1-butanol, 2-methyl-2-butanol, 2,2-dimethyl-1-propanol, 1-pentanol, 2-pentanol, 4-methyl-2-pentanol, propylene glycol, 1,3-butanediol, 1,4-butane diol, 2-methyl-1,3-propanediol, 2-methyl-2,4-pentanediol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, trimethyolpropane, trimethylolpropane allyl ether, glycerol ethoxylate, glycerol ethoxylate-co-propoxylate triol, glycerol propoxylate, pentaerythritol, 1-methoxy-2-propanol (propylene glycol methyl ether), 1-ethoxy-2-propanol, 1-propoxy-2-propanol, 1-butoxy-2-propanol, 2-butoxyethanol, di(propylene glycol) butyl ether,poly(propylene glycol) monobutyl ether, di(propylene glycol) dimethylether, methyl acetate, ethyl acetate, ethyl lactate, 2-methoxyethyl acetate, 2-butoxyethyl acetate, propylene glycol methyl ether acetate, propylene glycol ethyl ether acetate, acetone, methyl ethyl ketone, diacetone alcohol, MeO(EO)$_{7.5}$—CH$_2$—CH$_2$—CH$_2$—Si—(OMe)$_3$ wherein MeO is methoxy and (EO) is as defined above; and combinations thereof.

In another specific embodiment, the stabilizing agent when used in a stability-increasing amount provides for a period of stability for said conversion coating which is at least two times that of an equivalent composition having no added stabilizing agent. In a further more specific embodiment the stabilizing agent provides a period of stability for said composition, which is at least three times that of an equivalent composition having no added stabilizing agent. In a most specific embodiment the stabilizing agent provides a period of stability for said composition, which is at least five times that of an equivalent composition having no added stabilizing agent. In one more specific embodiment the stabilizing agent provides for a period of stability of the composition of specifically a least about 48 hours, more specifically from about 48 hours to about 5 years, still more specifically from about 72 hours to about 3 years, even more specifically of from about 96 hours to about 2 years, and most specifically of from about 1 week to about 18 months at room temperature.

In another embodiment the phrase "a stability increasing amount" as pertains to the stabilizing agent, shall be understood to be an amount of stabilizing agent that provides for the periods of stability defined above. In a more specific embodiment, "a stability-increasing amount" shall be understood to be an amount of stabilizing agent that provides for the retarding of precipitation or gelation of the condensate in a detectable composition as described herein, compared to an equivalent composition that utilizes less than such an amount of the same stabilizing agent. It will be understood that a stability-increasing amount will vary widely depending on factors such as the stabilizing agent, the metal-containing compound (b) and other composition components as described herein. In one embodiment herein, it will be understood herein that a stability-increasing amount is any additional amount beyond any amount of stabilizing agent that may be generated in the hydrolysis of the metal-containing compounds (b), such as the organofunctional silane, tetraalkoxyzirconate and/or tetraalkoxytitanate, and will increase the stability of the aqueous solution of partial and/or complete condensate of metal-containing compound (b).

In another embodiment herein the conversion coating compositions described herein are substantially free of chromium and/or phosphate. In one specific embodiment herein, the compositions described herein can have a high flashpoint. In a further specific embodiment high flashpoint can comprise a flashpoint of at least about 21 degrees Celsius, more specifically greater than about 25 degrees Celsius and most specifically greater than about 30 degrees Celsius. In one embodiment herein, high flash point can comprise a flashpoint of from about 24 to about 50 degrees Celsius, more specifically from about 24 to about 38 degrees Celsius and most specifically from about 30 to about 38 degrees Celsius. The flash point is determined in accordance ASTM D93-13e1, Standard Test Methods for Pensky-Martens Closed-Cup Tester.

In another specific embodiment herein, additionally, as an optional silane adjuvant to the above components, the conversion coating composition and methods described herein may include a C$_1$-C$_4$ alkoxy silane compound to provide Si—O bonds in the working solutions. In another specific embodiment herein, such Si—O bonds can comprise Si—O—Si bonds with the adjuvant and the silanes(s) described herein. In another specific embodiment herein, the compositions and methods described herein may include at least one C$_1$-C$_4$ alkoxy silane compound and more specifically at least two C$_1$-C$_4$ alkoxy silane compounds.

In one more specific embodiment, these adjuvant compounds can be represented by the formula (XI)

wherein R$^{29}$ is a monovalent hydrocarbon group having from 1 to about 10 carbon atoms, more specifically from 1 to about 8 carbon atoms and most specifically from 1 to about 4 carbon atoms, or OR$^{33}$ and each R$^{33}$ is independently chosen from C$_1$-C$_4$ alkyl. In one even more specific embodiment herein some non-limiting examples of formula (XI) can be at present, tetraethylorthosilicate (TEOS) or methyltriethoxysilane can be mentioned.

In one embodiment herein, these compounds of formula (XI) and others encompassed by the formula will hydrolyze in solution (such as aqueous solution) to provide a source of Si—O bonds. In one other embodiment herein the conversion coating compositions and method(s) herein can further comprise water specifically in addition to any water present in aqueous cerium oxide sol described herein.

In one embodiment herein, the conversion coating described herein can contain water soluble dye (iii) in an amount of from about 0.0001 to about 5 weight percent, more specifically from about 0.0005 to about 2 weight percent, and most specifically from about 0.001 to about 1 weight percent; a metal corrosion inhibitor (i), specifically an organofunctional silane and/or hydrolyzate and/or partial or complete condensate thereof in an amount of specifically from about 0.01 to about 80 weight percent, more specifically of from about 0.1 to about 60 weight percent and most specifically of from about 1 to about 40 weight percent and used in combination with a metal fluoride-containing component (iv) in an amount of specifically from about 0.01 to about 10 weight percent, more specifically from about 0.05 to about 5 weight percent and most specifically from about 0.1 to about 1 weight percent; colloidal metal oxide in an amount of specifically from about 0.001 to about 36 weight percent, more specifically of from about 0.01 to about 25 weight percent and most specifically of from about 0.1 to about 20 weight percent; and water (ii) in sufficient amount so that the total weight of the conversion coating composition is 100 weight percent; optional stabilizing agent in an amount of specifically from about 1 to about 50 weight percent, more specifically of from about 2 to about 40 weight percent and most specifically of from about 3 to about 30 weight percent; and, optionally a silane adjuvant in an amount of specifically from about 0.01 to about 15 weight percent, more specifically of from about 0.1 to about 10 weight percent and most specifically of from about 0.1 to about 5 weight percent, all of said weight percents being based on the total weight of the conversion coating. It will be understood herein that the respective amounts of components and any optional components used in the conversion coating (and any other conversion coating described herein) will total 100 weight percent and amounts of the above stated ranges (and any other amounts listed in any other conversion coating composition described herein) will be adjusted if necessary to achieve the same. In another embodiment the methods described herein can use the same composition amounts described above for the conversion coating composition.

In one more specific embodiment, some non-limiting examples of exemplary conversion coating compositions are those which are substantially chromate and/or specifically substantially phosphate free and include:
 (a) from about 0.01 to about 80 weight percent, more specifically from about 0.1 to about 70 weight percent and most specifically from about 3 to about 60 weight percent metal-corrosion inhibitor (i), where said corrosion inhibitor (i) is ureido silane or hydrolyzate and or partial or complete condensate forms thereof and from about 0.01 to about 10 weight percent, more specifically from about 0.05 to about 5 weight percent and most specifically from about 0.1 to about 1 weight percent metal fluoride-containing component (iv);
 (b) water (ii) in sufficient in an amount to so that the total of all the components of the conversion coating compositions is 100 weight percent;
 (c) from about 0.0001 to about 5 weight percent, more specifically from about 0.0005 to about 2 weight percent, and most specifically from about 0.001 to about 1 weight percent water soluble dye (iii) such as the non-limiting example of fluorescent brightener 363 CAS: 95078-19-6;
 (d) from about 0.001 to about 36 weight percent, more specifically from about 0.01 to about 25 weight percent and most specifically from about 0.1 to about 20 weight percent colloidal metal oxide;
 (e) optional stabilizating agent percent in an amount of up to about 25 weight percent, more specifically from about 0.1 to about 20 weight percent and most specifically from about 1 to about 15 weight percent;
 (f) optional silane aduvant, specifically a $C_1$-$C_4$ alkoxy silane compound or hydrolyzate thereof in an amount of up to about 25 weight percent, more specifically from about 0.01 to about 20 weight percent and most specifically from about 1 to about 15 weight percent; and
 (g) optionally minimum amounts of pH adjustment agents, said minimum amounts of pH adjustment agents being specifically from about 0.001 to about 1.2 weight percent, more specifically from about 0.01 to about 1.0 weight percent and most specifically from about 0.01 to about 0.6 weight percent, said weight percents are based on the total weight of the conversion coating composition.

In one embodiment herein the conversion coating composition is a conversion coating composition consisting essentially of:
 (a) at least one ureido silane having the structure:

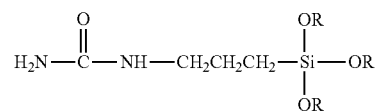

wherein R is independently hydrogen or alkyl of from 1 to about 4 carbon atoms, or condensate compounds therefrom in the amount of from about 0.01 to about 80 weight percent and at least one metal fluoride-containing component (iv) in the amount from about 0.1 to about 1 weight percent;
 (b) water (ii), in an amount so that the total of all the components of the conversion coating compositions is 100 weight percent;
 (c) water soluble dye (iii) in an amount of from about 0.001 to about 2 weight percent; and,
 (d) cerium oxide particles in the amount of from about 0.001 to about 36 weight percent; wherein the weight of the ureido silane is the sum of the weights of each ureido silane component and the weight percents are based upon the total weight of the conversion coating composition.

In a most specific embodiment herein there are provided conversion coatings having the following range (in weight percent) of the components:
 (a) from about 3 to about 60 weight percent of the metal corrosion inhibitor (i), wherein said corrosion inhibitor (i) is an ureido silane or hydrolyzate form thereof, and from about 0.1 to about 1 weight percent metal fluoride-containing component (iv);
 (b) water (ii) in an amount so that the total weight of all the component of the conversion coating composition is 100 weight percent;
 (c) from about 0.001 to about 1 weight percent water soluble dye (iii) such as the non-limiting example of fluorescent brightener 363 CAS: 95078-19-6;
 (d) from about 0.001 to about 10 weight percent silicon and/or cerium oxide particles;
 (e) from about 1 to about 15 weight percent stabilizing agent;
 (f) from about 1 to about 15 weight percent silane adjuvant; and
 (g) minor amounts of pH regulating (adjustment) agents, wherein minor amounts is equivalent to minimum amounts described above for pH adjustment agents.

In one embodiment herein the herein-described compositions having components in the noted weight percent amounts are present in such weight percent amounts based on the total combined weight percent of the conversion coating compositions (e.g., 100 weight percent).

In a further embodiment, there is provided herein a conversion coating consisting essentially of:
 (a) at least one metal corrosion inhibitor (i), wherein said corrosion inhibitor (i) is an ureido silane having the structure:

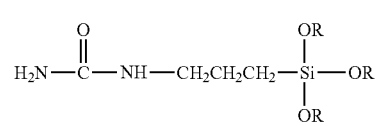

wherein R is independently hydrogen or an alkyl of from 1 to about 4 carbon atoms, or condensate compounds therefrom in the amount of from about 0.01 to about 80 weight percent and at least one metal fluoride-containing component (iv) of from about 0.01 to about 10 weight percent;
  (b) water (ii) in an amount so that the total weight of the conversion coating composition is 100 weight percent;
  (c) at least one water soluble organic dye (iii) in an amount of from about 0.001 to about 1 weight percent and having the structure of formula (I) or (II);
  (d) cerium oxide particles in the amount of from about 0.001 to about 36 weight percent; and
  (e) stabilizing agent in the amount of about 1 to about 20 weight percent, wherein the weight of the ureido silane is the sum of the weights of each ureido silane component and the percent by weight is based upon the total weight of the conversion coating.

In one embodiment herein the herein-described conversion coating compositions having components in the noted weight percent amounts are present in such weight percent amounts based on the total combined weight percent of the compositions (e.g., 100 weight percent).

In another embodiment herein, hazardous air pollutants (HAPS) such as the non-limiting example of MeOH are removed from the mixing process (method) in which the ureido silane, (aqueous) cerium sol and metal fluoride-containing component are first mixed. In another embodiment, after removal of substantial amount of the MeOH or other volatiles formed via this mixing, stabilizing agents and optionally water, are added to the reaction mixture to enhance product stability. In one specific embodiment, the stabilizing agents, especially those with a boiling point above that of water, can also be added before the removal of MeOH and/or other volatiles. Methanol is a hazardous air pollutant (HAP) and volatile organic compound (VOC).

In one embodiment herein there is also provided a conversion coating composition comprising:
  (a) at least one a metal corrosion inhibitor (i), where said metal corrosion inhibitor (i) is an organofunctional silane and/or hydrolyzate and/or partial or complete condensate thereof and a metal fluoride-containing component (iv);
  (b) water (ii);
  (c) water soluble organic dye (iii) having a positive charge and a counterion derived from a carboxylic acid containing from 1 to about 6 carbon atoms; and,
  wherein said composition does not contain detrimental amounts of precipitates for a period of at least 48 hours when stored at 25° C. It will be understood herein that all of the choices described herein for the conversion coating, the organofunctional silane component (a), the metal fluoride-containing component (iv), the dye (c) and water (b), optional stabilizing agent, optional adjuvant, optional pH adjustment agents, method(s), coated substrate, and any other description provided herein also applies equally to the conversion coating composition in the absence of colloidal oxide component.

In one specific embodiment herein, at present some non-limiting exemplary methods disclosed herein, comprise contacting the desired metal surface with an aqueous sol comprising: (i) a metal-corrosion inhibitor selected from the group consisting of zirconium-containing compounds, titanium containing compounds, and silicon-containing compounds, with the proviso that when the metal-corrosion inhibitor is a silicon-containing compound, then the conversion coating composition also contains a metal fluoride-containing compound (iv), (ii) water, a water soluble dye, (iii).

In another embodiment herein the conversion coating compositions and/or methods described herein can be used to provide a conversion coating for metals such as steel and aluminum and zinc-coated steel, wherein said conversion coating improves adhesion to further coatings thereon such as the non-limiting example of paint, and likewise provides improved corrosion protection to said metals. In yet another embodiment, metals treated by the conversion coating and/or methods herein can be used in commercial and industrial applications of coated metal sheets such as sheet metal used in construction and cold-rolled steel, and the like. The shape of the substrate can be in the form of a sheet, plate, bar, rod or any shape desired.

There is provided herein a method of determining the uniformity and/or thickness of a conversion coating composition applied to a substrate comprising:
  (a) applying a metal surface conversion coating to a metal surface of a substrate wherein the conversion coating comprises:
    (i) at least one metal corrosion inhibitor selected from the group consisting of a zirconium-containing compound, titanium-containing compound and silicon-containing compound, wherein said silicon-containing compounds is used in combination with a metal fluoride-containing compound (iv);
    (ii) water and,
    (iii) a water soluble dye, such that when the conversion coating composition is applied to a metal surface, the dye is visible to the naked eye and/or its presence is detectable and its intensity is measurable by optical instrumentation;
    wherein said conversion coating does not contain detrimental amounts of precipitates for a period of at least 48 hours when stored at 25° C.; and,
  (b) measuring the intensity of the water-soluble dye (iii) within a predetermined area of the applied conversion coating composition by optical instrumentation to provide a measured intensity of the dye; and,
  (c) relating the measured intensity of the dye to the thickness and/or uniformity of the applied conversion coating.

In the present invention, the conversion coating is prepared by the method comprising:
  (a) adding the metal corrosion inhibitor (i), wherein said corrosion inhibitor is an organofunctional silane and/or hydrolyzate and/or partial or complete condensate thereof to water (ii) and mixing the admixture to form an aqueous solution;
  (b) hydrolyzing and partially or completely condensing the organofunctional silane of step (a);
  (c) adding the metal fluoride-containing component (iv) and colloidal metal oxide to the step (b);
  (d) adding the water soluble organic dye (iii) having the herein described parameters to either step (b) or step (c); and optionally
  (e) adding a stabilizing agent to any of the steps (a) to (d).

In one embodiment, the pH of the conversion coating is specifically of from about 3 to about 9, more specifically of from about 4 to about 6.

In the present invention, a conversion coating, is deposited (e.g., coated) upon at least a portion of the outer surface of the metal substrate. The entire outer surface of the metal substrate is coated with the conversion coating.

There is provided herein a metal substrate coated with a conversion coating comprising:

(a) a metal corrosion inhibitor (i), wherein said corrosion inhibitor (i) is an organofunctional silane or hydrolyzate and/or partial or complete condensate thereof;
(b) water (ii);
(c) water soluble organic dye (iii) having the herein described parameters;
(d) metal fluoride-containing component (iv); and
(e) colloidal metal oxide, wherein said conversion coating does not contain detrimental amounts of precipitates for a period of at least 48 hours when stored at 25° C.

The conversion coating may be applied to the surface of the metal substrate by any conventional application technique, such as spraying, immersion or roll coating in a batch or continuous process. The temperature of the conversion coating at application is typically from about 10° C. to about 85° C., and preferably from about 15° C. to about 60° C.

Continuous processes are typically used in the coil coating industry and also for mill application. The conversion coating can be applied by any of these conventional processes. For example, in the coil industry, the substrate is cleaned and rinsed and then usually contacted with the treating solution by roll coating with a chemical coater. The treated strip is then dried by heating and painted and baked by conventional coil coating processes.

Mill application of the treating solution can be by immersion, spray or roll coating applied to the freshly manufactured metal strip. Excess conversion coating is typically removed by wringer rolls. After the conversion coating has been applied to the metal surface, the metal is dried at room temperature or at elevated temperatures to remove the water and promote the condensation reactions of the components with themselves and with the surface to form the dried and cured conversion coating on the surface of the substrate. Alternately, the treated substrate can be heated at from about 65° C. to about 125° C. for 2 to about 60 seconds to produce a coated substrate having a dried residue of the conversion coating, such as a pretreatment coating, thereon. If the substrate is already heated from the hot melt production process, no post application heating of the treated substrate is required to facilitate drying. The temperature and time for drying the detectable composition will depend upon such variables as the percentage of components (i), (ii), (ii), and optionally other additives in the conversion coating and type of substrate.

If the substrate is a metal substrate, before depositing the conversion coatings upon the surface of the metal substrate, foreign matter is typically removed from the metal surface by thoroughly cleaning and degreasing the surface. The surface can be cleaned by physical means, such as by mechanical abrasion, or by chemical means, such as by cleaning/degreasing the surface with commercially available alkaline or acidic cleaning agents, such as sodium metasilicate and sodium hydroxide. A non-limiting example of a cleaning agent is CHEMKEEN 163, a phosphate cleaner, which is commercially available from PPG Industries, Inc. of Pittsburgh, Pa. Following the cleaning step, the metal substrate is usually rinsed with water, specifically deionized water, in order to remove any residue. The metal substrate can be air dried using an air knife, by flashing off the water by brief exposure of the substrate to a high temperature, or by passing the substrate between squeegee rolls.

In yet another specific embodiment herein, the conversion coating described herein is applied to the treated metal surface to result in a conversion coating weight of equal to or greater than about 0.5 milligram per square foot (5 mg per square meter) of the treated surface, more specifically applied to the treated metal surface with a weight of from about 0.5 to about 500 milligrams per square foot (about 5to about 5,400 mg per square meter) being more specific weight of from about 3 to about 300 milligrams per square foot (about 32 to about 3,200 mg per square meter).

After the conversion coating is applied on the substrate it can be dried and/or cured at room temperature or by exposure to heat, using methods known by those skilled in the art. In one non-limiting embodiment herein the conversion coating can be water washed following its application, but such a water washing step can also be excluded and the conversion coating can just be allowed to drip dry or use any of the other drying means described herein. In one embodiment, the amount of water used to wash the surface can be any amount necessary to remove any conversion coating which has not adhered to the surface of the metal surface and will vary greatly depending on the contents of the conversion coating and the type of metal surface and is determinable by those skilled in the art.

As stated above, the conversion coating after being applied can be resistant to water washing, i.e., the use of water wash does not remove a substantial amount or any of the conversion coating from the metal surface. In one embodiment, the conversion coating will still be present in an amount of at least 80% by weight, more specifically at least 90% by weight and most specifically at least 95% by weight based on the weight of the conversion coating applied to the metal surface prior to water washing.

The measuring of the intensity of the water-soluble dye within a predetermined area of the applied conversion coating composition by optical instrumentation to provide a measured intensity of the dye can be conducted following coating of the substrate with the conversion coating or after the conversion coating is dried and/or cured.

In one embodiment, the measuring of the intensity of the water-soluble dye within a predetermined area of the applied conversion coating composition can be by instrument, such as by colorimeter or a fluorometer.

If visual observation is used, the water soluble organic dye (iii) can be a colored dye that imparts a color in the visible range of the electromagnetic radiation spectrum or a fluorescent dye that is excited with an external radiation source, such as an ultraviolet lamp or visible lamp. The naked human eye is able to differentiate between different intensities of color. The naked human eye scanning the surface of the substrate treated with the conversion coating can determine non-uniformity in the color or areas on the substrate that contain or do not contain any conversion coating, because these areas have or do not have the color of the colored dye, or fluoresce or do not fluoresce when excited.

It will be understood herein that "optical instrumentation" can comprise any of the optical methods described herein, such as a colorimeter, fluorimeter, phosphorescene detector and other known techniques of optical instrumentation. The intensity of the water-soluble dye can be determined in each separate optical method to obtain a quantifiable value of color as is measurable by the respective optical instrument. In one embodiment, the intensity will be a comparative measurement of the quantifiable value of color determined by the respective optical instrument as compared to a standard having known color intensity.

If a quantitative determination is needed, a calibration procedure is performed in order to "relate" the measured visible intensity of the dye (iii) with the weight/thickness and/or uniformity of the conversion coating containing the colored dye component. At least 3 calibration standards are produced with known conversion coating weights or thicknesses and/or uniformity representative of the range of the conversion coating weights or thicknesses and/or uniformity that are desirable. It is preferred that a more statistically significant eight calibration standard samples are utilized, including 2 samples of blank substrate, two samples representative of target detectable composition weight/thickness and/or uniformity, two samples representative of low conversion coating weight/thickness and/or uniformity and two samples representative of high conversion coating weight or thickness and/or uniformity. These calibration standards may be prepared using coating methods known to one skilled in the art. The color intensity is determined by taking these standards of various color intensity and comparing them to the sample of the substrate containing the conversion coating, using visual observation to match the color intensity of the sample substrate with the standards of known weight/thickness and/or uniformity. Once the match is made, the weight/thickness and/or uniformity is determined by referencing the amount of weight/thickness and/or uniformity used to prepare the standard. The conversion coating weight for each calibration standards can be verified independently using any appropriate method known by one skilled in the art. A preferred independent method would be the use of XRF (X-ray) fluorescence spectrometers, which measure the elements on the surface of the substrate. Illustrative of the method, substrates coated with varying amounts of the conversion coating and dried can be analyzed using an XRF (X-ray) fluorescence spectrometer, as for example, an Oxford Twin-X bench top XRF spectrometer with a Focus-5+ detector, tube voltage of 4 kV, tube current of 750 uA, and measuring time of 5 minutes. The peak area, expressed in counts per second, is interpolated on a calibration curve of a set of previously measured standards. The standards can be prepared by coating methods which deposit a very precise amount of conversion coating on the surface of a substrate, such as spin coating or draw-down bars.

If a fluorometer is used, the water soluble organic dye (iii) will be a fluorescent dye distributed in the conversion coating. Visual observation, where the detector is the human eye, can also be used to detect a water soluble fluorescent organic dye (iii), provide, provided that the dye is excited with an external radiation source, such as an ultraviolet or visible lamp.

The uniformity of the conversion coating composition can determined using the method of colored standards and observing different portions (areas) of the treated substrate (e.g. predetermined areas). A mask, such as a sheet of material with a hole can be used to focus the visual observation to a specific known (predetermined) area, and then to compare the intensity of the color with the standards. The mask prevents bias that the surrounding colored area of the treated substrate might introduce into the observation. In addition, the uniformity as a function of the area being observed can also be determined by varying the size of the hole in the mask. The uniformity can then be assessed relative to the size of the area of the mask. In complex shapes, this method allows for an unbiased determination of the conversion coating weight/thickness and/or uniformity at corners, on flat surfaces, which may vary due to the different wetting out and wicking of the conversion coating.

The fluorescence can be measured by methods known in the art. Typically, a detection station includes a light source for emitting light onto the conversion coating of a wavelength and intensity sufficient to cause the fluorescent component of the conversion coating to fluoresce at detectable levels and a detector which collects light produced by the fluorescence of the fluorescent component of the conversion coating and converts the collected light into an analog or digital signal indicative of the intensity of the fluorescence of the coating. The light source and the detector can be housed together in a probe head.

The fluorescence can be measured by methods known in the art. Typically, a detection station includes a light source for emitting light onto the conversion coating of a wavelength and intensity sufficient to cause the fluorescent component of the conversion coating to fluoresce at detectable levels and a detector which collects light produced by the fluorescence of the fluorescent component of the conversion coating and converts the collected light into an analog or digital signal indicative of the intensity of the fluorescence of the coating. The light source and the detector can be housed together in a probe head.

The light source emits electromagnetic radiation in the ultraviolet and/or visible spectral regions. A preferred light source is a mercury vapor lamp filtered optically such that only those emissions lines between 250 and 400 nm are incident upon an illuminated sample. Alternative light sources include, but are not limited to xenon lamps, deuterium lamps, hollow cathode lamps, tungsten lamps, ion lasers, solid state lasers, diode lasers and light emitting diodes. It is preferred that the energy or energy range of the light source used is coincident with that of one or more electronic absorption bands of the fluorescing agent incorporated into the sample, but not coincident with that of the fluorescence emission of the same fluorescing agent.

The detector collects light produced by the fluorescence of the fluorescent component of the conversion coating and converts the collected light into an analog or digital electrical signal indicative of the intensity of the fluorescence of the coating. The detector contains optics for the collection and spectral filtering of light that is reflected by and emitted by a sample following illumination with light from the aforementioned light source. It is preferred, but not essential, that the spectral filtering optics reject light of energy or energy range coincident with that of the light source, while transferring, to the optical fiber, light of energy or energy range coincident with the fluorescence emission of the fluorescing agent in the sample. This light of energy or energy range coincident with the fluorescence emission of the fluorescing dye in the sample can be conveyed via optical fiber to the main detector unit. The detector unit can comprise any means known to one skilled in the art to isolate and measure electromagnetic radiation of an energy or energy range coincident with that of the fluorescence emission of the fluorescing agent in the sample. One embodiment of the main detector unit is a spectrograph comprising a single monochromator with a photodiode array. The light exiting the optical fiber enters the monochromator and is dispersed by energy using a grating and then is imaged onto the photodiode array to produce an electrical signal.

The signal is passed to a computing device, such as a general purpose or dedicated computer, which converts the signal into a reading of the thickness of the conversion coating based upon a pre-determined relationship between the fluorescence intensity of the conversion coating and the thickness and weight and/or uniformity of the conversion coating. The signal is first converted to a measurement of the fluorescence intensity of the conversion coating. The thickness of the conversion coating is then determined by entering the measurement of the fluorescence intensity into a formula describing the predetermined mathematical relationship between the thickness and weight of the conversion coating and fluorescence intensity of the conversion coating.

Optionally, the computing device may be connected to an alarm device which is activated when the thickness of the conversion coating falls outside of a critical range.

Because the conversion coating may be applied, and the fluorescence of the conversion coating may be measured at different times during the manufacture of the item, the application (coating) station and the detecting station need not be sequential in a manufacturing line, or even in the same building or geographical location. For example, a metal roll or sheet can be coated in a mill and the thickness of the conversion coating can be determined immediately following the application of the conversion coating, or shortly thereafter following a drying or curing step.

A coating station can be provided after the detection station for application of additional conversion coating if the initial thickness of the conversion coating falls below a desired critical thickness. This station would be inactive during normal operations, but can be activated manually or automatically when the conversion coating thickness falls below a critical thickness. The amount of conversion coating applied by this second coating station can be variable to prevent over-coating of the substrate, resulting in a conversion coating which is too thick. The thickness of the conversion coating applied by the second coating station can be controlled automatically by reference to the thickness of the initially applied conversion coating on the substrate previously measured at the detection station. Typically, the activation of this station would be automatic and the activation would coincide with an alarm to notify operators of the line of the insufficient operation of the first coating station.

Alternatively, depending upon the nature of the coating and the logistics of the manufacturing process, the determination of the conversion coating thickness can be made well after the coating step, and with many intervening steps. For instance, the metal can be slit, cut, shaped, stamped, welded or otherwise processed before the thickness of the conversion coating is determined. In many instances, this is desirable in order to ascertain whether the conversion coating remains on the manufactured item in a thickness sufficient to protect the underlying metal substrate. For example, steel strip may be manufactured and coated overseas and sold domestically to a manufacturer who processes the metal, and prior to application of a subsequent coating layer, would ascertain the thickness of the conversion coating on the metal. In any case, the detection station can be followed by the above-described second coating station to ensure that the conversion coating layer is of the desired thickness.

A calibration procedure is performed in order to correlate the measured fluorescence signal intensity with the weight/thickness and/or uniformity of the conversion coating containing the fluorescent component. At least 3 calibration standards are produced with known detectable composition weights or thicknesses and/or uniformity representative of the range of the conversion coating weights or thicknesses and/or uniformity that are desirable. It is preferred that a more statistically significant eight calibration standard samples are utilized, including 2 samples of blank substrate, two samples representative of target conversion coating weight/thickness and/or uniformity, two samples representative of low conversion coating weight/thickness and/or uniformity and two samples representative of high conversion coating or thickness. These calibration standards may be prepared using coating methods known to one skilled in the art. The measured value of fluorescence intensity is determined using the measuring device (detector) described previously. The measured fluorescence intensity can be expressed as either the intensity at the energy of the maximum of the fluorescence emission spectrum, or as the area under the fluorescence emission spectrum. It is preferred, but not essential, that a statistically significant number of replicate measurements, e.g. six, are performed on each calibration standard sample. Conversion coating weight for each calibration standard sample is then verified independently using any appropriate method known by one skilled in the art. A preferred independent method would be the use of XRF (X-ray) fluorescence spectrometers, which measure the elements on the surface of the substrate. Illustrative of the method, substrates coated with varying amounts of the conversion coating and dried can be analyzed using an XRF (X-ray) fluorescence spectrometer, as for example, an Oxford Twin-X bench top XRF spectrometer with a Focus-5+ detector, tube voltage of 4 kV, tube current of 750 uA, and measuring time of 5 minutes. The peak area, expressed in counts per second, is interpolated on a calibration curve of a set of previously measured standards. The standards can be prepared by coating methods which deposit a very precise amount of conversion coating on the surface of a substrate, such as spin coating or draw-down bars. A plot of verified coating weight versus measured fluorescence intensity yields a calibration plot. A mathematical expression of the relationship between conversion coating weight or thickness and fluorescence intensity can be derived by one skilled in the art from a best fit line through the points on the plot.

If a colorimeter is used, the water soluble dye (iii) is a colored dye. A colorimeter is a device the measures the absorbance of a specific wavelength of light in a conversion coating. The concentration of the colored, water soluble dye (iii) in the conversion coating can then be determined using Beer-Lambert Law, which states that the concentration of the dye is proportional to the concentration of the dye. The essential parts of a colorimeter are: a light source (often an ordinary low-voltage filament lamp), an adjustable aperture, a set of colored filters, a cuvette to hold the working solution, a detector (usually a photoresistor) to measure the transmitted light and a meter to display the output from the detector. Numerous colorimeters are commercially available for measuring the color of liquid solution and dried substances, such as for example, Minolta CR-400 hand held device.

The colorimeter is placed on the surface of the treated substrate containing conversion coating and activated. The colorimeter provides an analysis of the color and the intensity of the color.

Standards of carefully prepared substrates containing known amounts of the conversion coating, as discussed above, can be used to calibrate the colorimeter.

In one specific embodiment, the method for determining the weight of the conversion coating on the surface of bare or coated metal substrate comprises:
 (i) preparing a series of conversion coating at different concentrations;
 (ii) coating a series of metal substrates with the conversion coating,
 (iii) optionally, drying the conversion coating under the same drying conditions that are used in the on-line coating process;
 (iv) determining the amount of the conversion coating on the surface of each of the treated metal substrates and the areas that are coated and calculate the amount of conversion coating gravimetrically using the equation, weight of conversion coating=$(w^2-w^1)$/(area of coated surface) if only one side of the substrate is coated or weight of conversion coating=$(w^2-w^1)$/[(2)(area of coated surface)] if two sides of the substrate are coated;

or determine the amount of conversion coating on the metal substrate by using the XRF method where the XRF standard calibration curve was used to develop a least squared linear regression equation;

(v) measuring the a* value of the CIE L*a*b* color space using a colorimeter, such as Konica Monolta Chroma Meter CR-400 of each of the coated substrate of known conversion coating weight;

(vi) plotting the a* values versus conversion coating weight and calculating the least squares linear regression equation;

(vii) measuring the conversion coating on the bare or coated metal substrate by determining the a* value using a colorimeter;

(viii) using the equation of step (vi) to calculate the amount of the conversion coating on the bare or coated metal substrate.

The disclosure herein will now be described in conjunction with the following examples which are to be regarded as being illustrative of certain embodiments of the disclosure herein but should not be viewed to restrict the disclosure. All percents herein are weight percents based on the total weight of the detectable composition unless indicated otherwise.

EXAMPLES

Example 1

Determining a Coating Thickness by Luminescence of Coated Materials

Conversion coating bath which was used in all examples herein:

TABLE 1

Composition of the conversion coating, Bath 1

| Ingredient | Amount |
|---|---|
| demineralized water | 959.5 grams |
| dye-tracer (fluorescent brightener 363 CAS: 95078-19-6) | 0.5 grams |
| zirconium fluoride | 10 grams |
| 3-glycidoxypropyltrimethoxysilane (Silquest* A-187 from Momentive) | 30 grams |

A conversion coating bath was prepared by adding the components in Table 1 under agitation. The conversion coating bath was aged for 1-hour at room temperature prior to further experimental work. A sample of a 3005 Al-alloy substrate was cleaned with xylene and with mild alkali silicate cleaner for 2 minutes at 70 degrees Celsius. An Al-strip of the Al-alloy substrate was immersed into the freshly prepared and aged conversion coating bath described in Table 1.

Four (4) samples of the Al-strip alloy were exposed to 0.5, 1, 2 and 4 minutes dwell times, respectively, in the conversion coating composition, Bath 1, of Table 1 at room temperature. After being removed from the reactive Bath 1, each of the four Al-strips were dipped several times into a fresh demineralized water for a minimum of 30-seconds dipping time in rinsing water. Afterwards the four Al-strips were rinsed with copious amounts of demineralized water. The four Al-strips were then dried in a lab oven for 2 minutes at 60 degrees Celsius.

The average coating weights of the conversion coating composition, Bath 1, coated on the four Al-strips described above for 0.5, 1, 2 and 4 minutes dwell times were measured gravimetrically and are summarized in the Table 2 below.

Gravimetric weights were determined by weighing the cleaned Al-strips before dipping, (m1), and weighing the panels after dipping, rinsing and drying (m2). The actual coating weights on the Al-strips were calculated by subtracting m2−m1 and dividing the resultant value by the area of the test surface exposed to dipping.

TABLE 2

| Sample No. | Ex. 1a | Ex. 1b | Ex. 1c | Ex. 1d |
|---|---|---|---|---|
| Dwell time, minutes | 0.5 | 1 | 2 | 4 |
| Coating weight | — | 38 mg/m$^2$ | 50 mg/m$^2$ | 70 mg/m$^2$ |

Inspection of the resulting deposits of the conversion coating on the four Al-strips treated with the conversion coating was done under a UV-black light lamp and under daylight, and images of the four Al-strips were taken under daylight and UV-black light as are shown in FIG. 1.

As shown in FIG. 1, an increasing intensity of light luminescence from the darkest for the coated panel with a dwell time of 0.5 minute sample to the lightest for the coated panel with a dwell time of 4 minutes was found to be in good agreement with an increasing corresponding coating weight deposited. Correspondingly, it was determined that the method described herein can be used for preliminary qualitative assessment of a coating thickness.

Example 2

Preparing of a Zirconium—containing Conversion Coating

A conversion coating composition, Bath 2, was prepared in accord with Table 3.

TABLE 3

Composition of conversion coating, Bath 2

| Ingredient | Weight |
|---|---|
| demineralized water | 989.5 grams |
| dye-tracer (fluorescent brightener 363 CAS: 95078-19-6) | 0.5 grams |
| zirconium fluoride | 10.00 grams |

The conversion coating composition, Bath 2, was prepared by adding the components of Table 3 under agitation. The conversion coating material was aged for 1-hour at room temperature prior further experimental work. Metal strips, 3005 Al alloy panels, were coated in accordance to Example 1. Inspection of the resulting deposits of the conversion coating composition indicated an increasing intensity of light luminescence from the darkest for the coated panel with a dwell time of 0.5 minutes to the lightest for the coated panel with a dwell time of 4 minutes, which is in good agreement with increasing coating weight deposited.

Example 3

Metal with Conversion Coating Composition of Bath 1 Viewed Under Black Light

Figure 2:
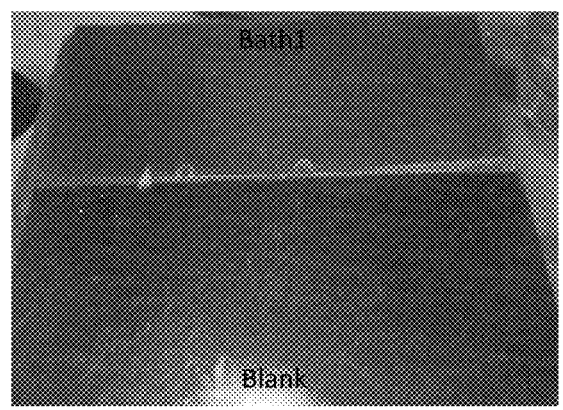
FIG. 2 is a set of photographs of a HDG-panel coated with the conversion coating coating of Example 3, Bath 2, and a blank of Comparative Example 4 under a black light.

A deposition experiment was performed in accordance with the method described in Example 1, except that hot-dip (HDG) galvanized steel panels were utilized instead of 3005 Al alloy, only a 1-minute dwell time in Bath 1 was used to prepare the coated panels and the analysis of light was done under a black light, as shown in the metal coated with Bath 1 of FIG. 2. As can be seen in the metal coated with Bath 1, there is a complete and homogenous coating of the metal, demonstrating how black light can be used to detect uniformity of a coating of the invention.

Comparative Example 4

Metal with No Conversion Coating Under Black Light

As a blank reference (blank), a HDG panel was cleaned in accordance with the cleaning method described in Example 1. The blank panel was not immersed into a conversion coating composition, and was exposed under black light as shown in the panel marked Blank in FIG. 2. As can be seen the blank metal shows various luminescence irregularities under black light showing that it has not been coated, which demonstrates the advantages of Example 3 over Comparative Example 4.

Example 5

Metal with Conversion Coating Composition, Bath 2, Under Black Light

Figure 3:
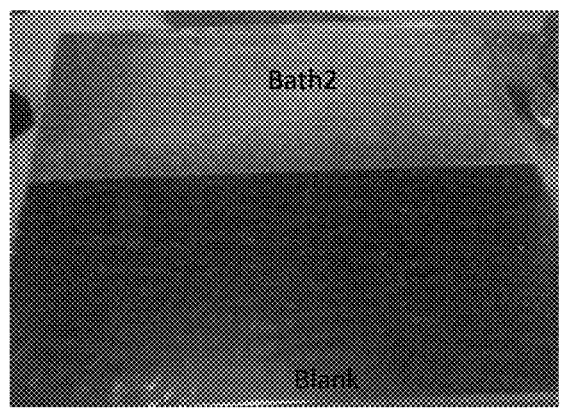
FIG. 3 is a set of photographs of a HDG-panel coated with conversion coating composition of Example 5, Bath 2, and a blank, Comparative Example 6, under black light.

A deposition experiment was performed in accordance with the method described in Example 1, except that hot-dip (HDG) galvanized steel panels were utilized instead of the 3005 Al alloy, only a 1-minute dwell time in Bath 2 and analysis of the light luminescence was done under a black light, as shown in the metal coated with Bath 2 of FIG. 3. As can be seen in the metal coated with the conversion coating of Bath 2 (without silane), there is not a complete and homogenous coating of the metal.

Comparative Example 6

Metal with No Conversion Coating Under Black Light

As a blank reference (blank), a HDG panel was cleaned in accordance with the cleaning method described in Example 1. The blank panel was not immersed into a conversion coating bath, and was exposed under black light as shown in the panel marked Blank in FIG. 3. As can be seen the blank metal shows various luminescence irregularities under black light showing that it has not been coated, which demonstrates the advantages of Example 5 over Example 6.

Example 7

Metal Coated with Conversion Coating Containing Dye Viewed Under Black Light

A conversion coating composition, Bath 1 was prepared in accordance with Example 1. A deposition experiment was performed in accordance with the method described in Example 1, except instead of a silicate cleaner, cleaning by dipping in mild alkali etch-cleaner for 2 minutes at 60° C. was utilized. Only a 1-minute dwell in Bath 1 was used for the light luminescence analysis. As can be seen for the metal coated with Bath 1 in FIG. 4, the presence of the dye provides for an easy determination of whether a metal has been coated with a conversion coating of the present invention. The results of this investigation demonstrated that the presence of a specific UV-dye tracer is mandatory to visualize a conversion coating layer for metal flouride and silane containing conversion coating materials.

Comparative Example 8

Metal Coated with Conversion Coating with No Dye Viewed Under Black Light

A conversion coating composition, Bath 3 was prepared in accordance with the Bath 1 in Example 1 except no UV-dye tracer was added. A deposition experiment was performed in accordance with the method described in Example 7. As compared to Example 7 above, the absence of the specific dye in Bath 3 did not detect the presence conversion coating composition or its uniformity.

Comparative Example 9

Metal Not Coated with Conversion Coating

Figure 4:
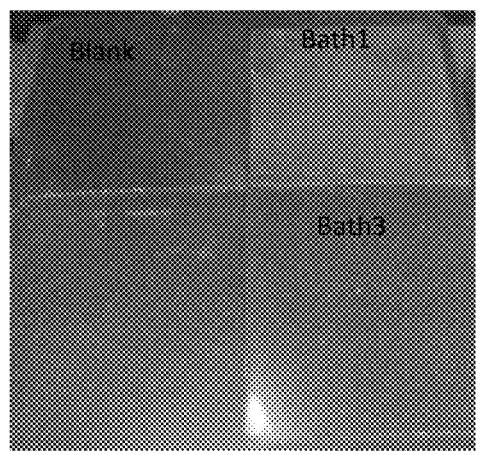
FIG. 4 is a set of photographs of panel cleaned with an alkali-etch cleaner and coated with the conversion coating of Example 7, Bath 1, with a conversion coating, Comparative Example 8, Bath 3 and blank, Comparative Example 9.

As a blank reference (Blank), a 3005 Al-alloy panel cleaned in accordance with the deposition experiment from Example 1 was utilized, except instead of a silicate cleaner, cleaning by dipping in mild alkali etch-cleaner for 2 minutes at 60° C. was utilized. The blank panel was not immersed into a conversion coating composition. The panel was inspected under a UV-black light lamp as shown in FIG. 4.

Example 10

Metal Coated with Conversion Coating Containing Dye of Invention Viewed Under Black Light A conversion coating composition, Bath 1 was prepared in accordance with the Example 1. A deposition experiment was performed in accordance with the method described in Example 1, except instead of the use of a silicate cleaner, cleaning by dipping in mild alkali etch-cleaner for 2 minutes at 60° C. was utilized. Only a 3-minute dwell time was used to prepared the coated panels for the further analysis. As can be seen in the metal coated with Bath 1 of FIG. 5 the presence of one of the specific dyes of the present invention provides for an easy determination of whether a metal has been coated with a conversion coating of the present invention. The results of this investigation demonstrated that the presence of a specific UV-dye tracer is mandatory to visualize a conversion coating layer for metal flouride and silane containing conversion coating materials.

Comparative Example 11

Metal Coated with Conversion Coating Containing Dye Outside the Scope of the Invention Viewed Under Black Light A conversion coating composition, Bath 5, was prepared in accordance with Example 1, except as a UV-dye tracer, Pyranin (Trinatrium-8-hydroxypyren-1,3,6-trisulfonat) was added at the same equimolar amounts used in Example 1. A deposition experiment was performed in accordance with the method described in Example 1, except instead of the use of a silicate cleaner, cleaning by dipping in mild alkali etch-cleaner for 2 minutes at 60° C. was utilized. Only a 3-minute dwell time in Bath 5 was used to coat the panel. When the coated panel with Bath 5 is compared to Example 10 above, the use of a dye outside the scope of the present invention does not provide for easy detection of the conversion coating. In the case of Pyranin-modified baths (Bath5) no visual UV-fluorescence was observed.

Comparative Example 12

Metal Not Coated with Conversion Coating Viewed Under Black Light

Figure 5:
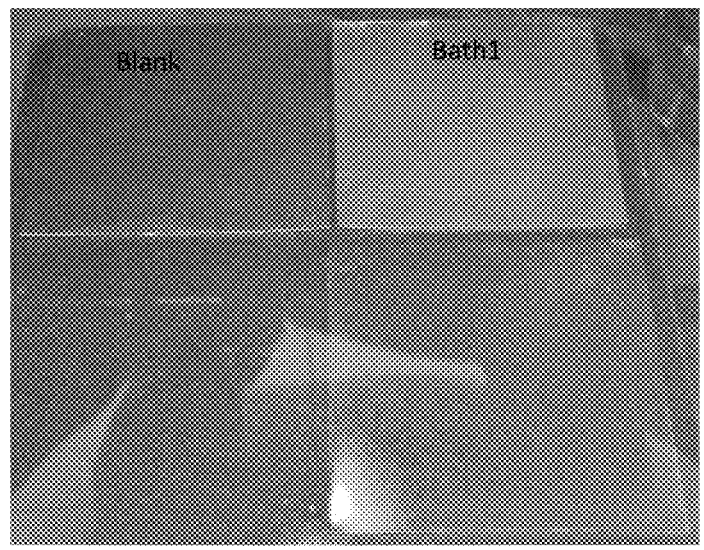
FIG. 5 is a set of photographs of panels prepared in Example 10, coated with Bath 1, in Comparative Example 11, coated with Bath 5, and Comparative Example 12, blank.

As a blank reference a 3005 Al-alloy panel cleaned in accordance with the deposition experiment from Example 1 was utilized. The blank panel was not immersed into the conversion coating bath. The panel was viewed under UV-black light lamp and is shown in FIG. 5 marked as the Blank panel.

Example 13

Metal Coated with Conversion Coating Containing Dye of the Invention Viewed Under Black Light A conversion coating composition, Bath 1, was prepared in accordance with Example 1. A deposition experiment was performed in accordance with the method described in Example 1, except that the panel was cleaned by dipping in mild alkali etch-cleaner for 2 minutes at 60° C. instead of the silicate cleaner, only a 3-minute dwell time of the panel in Bath 1 was used. The dye of the invention was visible in the conversion coating under black light to detail the presence of the conversion coating.

Comparative Example 14

Metal Coated with Conversion Coating Containing Dye Other than that of the Invention Viewed Under Black Light A conversion coating composition, Bath 7 was prepared in accordance with Example 1 except that a UV-dye tracer Rhodamie WT (9-(2,4-dicarboxyphenyl-3,6-bis(diethyl-amino)-xanthyliumchloride disodium salt) was added at the same equimolar amounts as indicated in Example 1. A deposition experiment was performed in accordance with the method described in Example 1, except that the panel was cleaned by dipping in mild alkali etch-cleaner for 2 minutes at 60° C. and only a 3-minute dwell time in Bath 7 was used. Results of the investigation demonstrated that UV-dye tracers not of the invention do not visualize a deposition effect in the conversion coating. In the case of the conversion coating composition containing a Rhodamine dye, Bath 7, no visual UV-fluorescence was observed.

Comparative Example 15

Metal Not Coated with Conversion Coating Viewed Under Black Light

Figure 6:
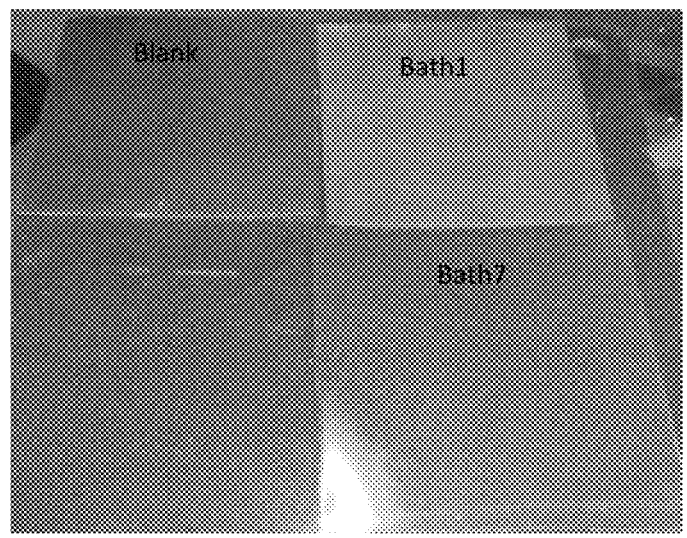
FIG. 6 is a set of photographs of panels prepared in Example 13, cleaned with an alkali etch cleaner and coated with Bath 1, in Comparative Example 14, Bath 7 and in Comparative Example 15, blank.

As a blank reference a 3005 Al-alloy panel cleaned in accordance with the deposition experiment from Example 1 was utilized. The blank panel was not immersed into a conversion coating bath. The panel was inspected under a UV-black light lamp as shown in the panel marked Blank in FIG. 6.

Comparative Example 16

Metal Coated with Conversion Coating Containing Dye Other than that of the Invention Viewed Under Black Light A conversion coating composition, Bath 9, was prepared in accordance with Example 1 except that a UV-dye tracer Tinopal®CBS SP Slurry33 (proprietary 4,4'-distyril biphenyl derivative) was used at the same equimolar amounts as indicated in Example 1. A deposition experiment was performed in accordance with the method described in Example 1, except that the panel was cleaned by dipping in mild alkali etch-cleaner for 2 minutes at 60° C. and only a 3-minute dwell time in Bath 9 was used. Results of the investigation demonstrated that the introduction of the UV-dye tracer Tinopal®CBS SP Slurry33 allowed for some visualization of the conversion coating when compared to Bath 11 in Example 17 below, but much less than that of the Bath 1 of FIG. 2 in Example 3; Bath 1 of FIG. 4 in Example 7; or Bath 1 of FIG. 5 in Example 10.

Comparative Example 17

Metal Coated with Conversion Coating Containing No Dye Viewed Under Black Light

A conversion composition, Bath 11, was prepared in accordance with Example 1 except that no UV-dye tracer was added. A deposition experiment was performed in accordance with the method described in Example 1, except that the panel was cleaned by dipping in mild alkali etch-cleaner for 2 minutes at 60° C. and only a 3-minute dwell in Bath 11 was used.

Comparative Example 18

Metal Not Coated with Conversion Coating Viewed Under Black Light

Figure 7:
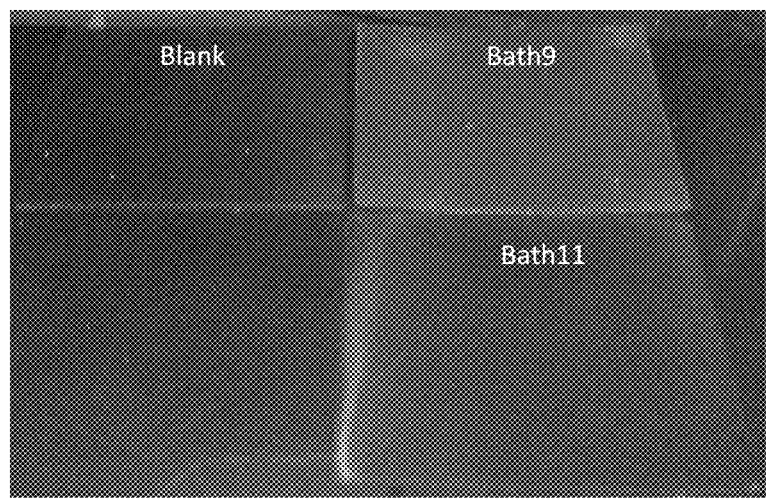
FIG. 7 is a set of photographs of panels prepared in Comparative Example 16, Bath 9, Comparative Example 17, Bath 11, and Comparative Example 18, blank.

As a blank reference a 3005 Al-alloy panel cleaned in accordance with the deposition experiment from Example 1 was utilized. The blank panel was not immersed in a conversion coating composition. The panel was viewed under UV-black light lamp, as shown in FIG. 7 marked as the Blank panel.

Examples 19-22

Metal Coated with Conversion Coating Compositions Containing Dyes and Metal-containing Components Conversion coating compositions are prepared by adding the components in Table 4 under agitation. The conversion coating bath is then aged for 1-hour at room temperature prior to further experimental work. Samples of 3005 Al-alloy substrate are cleaned with xylene and with mild alkali silicate cleaner for 2 minutes at 70 degrees Celsius. The Al-strips of the Al-alloy substrate are immersed into each of the freshly prepared and aged conversion coating baths. After the immersion into the respective conversion coating bath each Al strip is removed from the reactive bath, and each of Al-strips are separately dipped several times into a separate fresh demineralized water bath (min 30-seconds dipping time in rinsing bath). Afterwards the respective Al-strips are rinsed with copious amounts of demineralized water. The Al-strips are then dried in a lab oven for 2 minutes at 60 degrees Celsius.

TABLE 4

Composition of conversion coating compositions

| Ex. No | Dye (a) | Dye (a) amount, grams | Metal-containing compound (b) | Metal-containing compounds (b) amount, grams | Water Grams (g) |
|---|---|---|---|---|---|
| 19 | Amezine Rhodamine B Liquid, | 0.5 | $H_2ZrF_6$ | 20 | 979.5 |
| 20 | Amewhite BAC Liquid dissolved in acetic acid | 0.5 | $Ti(OCH_2CH_3)_4$ | 20 | 979.5 |
| 21 | Amezine Brilliant R Red P Liquid | 0.5 | $Na_2TiF_6$ | 20 | 979.5 |
| 22 | Amewhite BAC Liquid dissolved in acetic acid | 2.0 | $Zr(NO_3)_4$ | 5 | 979.5 |

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A method of coating a metal surface with a conversion coating composition, the method comprising:

applying a metal surface conversion coating composition to a metal surface wherein the conversion coating composition comprises:

(i) at least one metal corrosion inhibitor, wherein the at least one metal corrosion inhibitor is zirconium-containing compound selected from the group consisting of $ZrF_4$, $Zr(NO_3)_4$, $H_2ZrF_6$, $(NH_4)_2ZrF_6$, $Na_2ZrF_6$, $K_2ZrF_6$, $ZrO[NO_3]_2$, $Zr[SO_4]_2$ and $ZrOSO_4$;

or is a titanium-containing compound selected from the group consisting of $Ti(OCH_2CH_3)_4$, $H_2TiF_6$, $(NH_4)_2TiF_6$, $Na_2TiF_6$, $K_2TiF_6$ and $Ti[SO_4]_2$;

or, mixtures thereof;

(ii) water; and, (iii) at least one water soluble dye having the structure of formula (I)

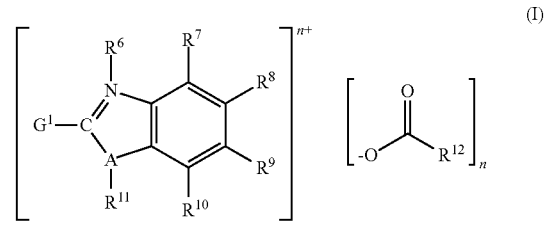

wherein:
$G^1$ is an organic group having from 1 to about 20 carbon atoms and containing at least one oxygen or nitrogen heteroatom;

A is a nitrogen atom or $(-)_3C-R^*$, where $R^*$ is a monovalent group chosen from alkyl, cycloalkyl, alkenyl, aralkyl or aryl group each having up to about 10 carbon atoms;

$R^6$ is an alkyl, a hydroxylalkyl, an alkoxyalkyl, a cycloalkyl, an aralkyl optionally substituted with a halogen or alkoxy group, an aryl optionally substituted with a halogen or alkoxy group, a cyanoalkyl, a carbamatoalkyl or a carboalkoxyalkyl group each containing up to about 10 carbon atoms, or hydrogen;

$R^7$ is an alkyl, alkoxy, aryl alkylsulfonyl, or arylsulfonyl group each containing up to about 10 carbon atoms or hydrogen;

$R^8$ is an alkyl, alkoxy, aryl alkylsulfonyl, arylsulfonyl, or aminosulfonyl group each containing up to about 10 carbon atoms or hydrogen;

$R^9$ is an alkyl, alkoxy, aryl alkylsulfonyl, or arylsulfonyl group each containing up to about 10 carbon atoms or hydrogen;

$R^{10}$ is an alkyl, alkoxy, aryl alkylsulfonyl, or arylsulfonyl group each containing up to about 10 carbon atoms or hydrogen:, $R^{11}$ is an alkyl, a hydroxylalkyl, an alkoxyalkyl, cycloalkyl, an aralkyl optionally substituted with a halogen or alkoxy group, an aryl optionally substituted with a halogen or alkoxy group, a cyanoalkyl, a carbamatoalkyl or an alkoxycarbonylalkyl group each containing up to about 10 carbon atoms or hydrogen, $R^{12}$ is an alkyl group containing from 1 to about 6 carbon atoms or hydrogen; and n is an integer of from 1 to 3, such that when the conversion coating composition is applied to a metal surface, the dye is visible to the naked eye and/or its presence is detectable and its intensity is measurable by optical instrumentation and where the metal surface conversion coating composition does not have detrimental precipitates in the amount of greater than 1000 milligrams of precipitate per kilogram of the conversion coating composition after the coating composition has been stored for a period of at least 48 hours at 25° C.

2. The method of claim 1 further comprising:
measuring the intensity of the water-soluble dye within a predetermined area of the applied conversion coating composition by optical instrumentation to provide a measured intensity of the dye; and,
using the measured intensity of the dye to calculate the thickness and/or uniformity of the applied conversion coating.

3. The method of claim 1, wherein the at least one metal corrosion inhibitor (i) is present in the amount of from about 0.01 to about 80 weight percent, based on the total weight of the metal surface conversion coating composition.

4. The method of claim 3 wherein the at least one metal corrosion inhibitor (i) is $H_2ZrF_6$, or $K_2ZrF_6$.

5. The method of claim 3 wherein the at least one metal corrosion inhibitor (i) is $H_2TiF_6$ or $K_2TiF_6$.

6. The method of claim 1 wherein the solubility of the dye (iii) is such that up to 0.0001 grams of the dye will dissolve in 100 grams of distilled of water at 25° C.

7. The method of claim 1 wherein the dye (iii) is in an amount of from about 0.0001 to about 5 weight, based on the total weight of the metal surface conversion coating composition.

8. The method of claim 1 wherein the dye (iii) is fluorescent brightener 363 CAS: 95078-19-6.

9. The method of claim 1 wherein the conversion coating composition is a chrome-free conversion coating.

10. The method of claim 1 wherein following the step of applying a conversion coating composition to the metal surface, the metal surface is washed with water.

11. A conversion coating composition comprising:
(i) at least one metal corrosion inhibitor compound selected from the group consisting of $ZrF_4$, $Zr(NO_3)_4$, $H_2ZrF_6$, $(NH_4)_2ZrF_6$, $Na_2ZrF_6$, $K_2ZrF_6$, $ZrO[NO_3]_2$, $Zr[SO_4]_2$ and $ZrOSO_4$;
or is at least one titanium-containing compound selected from the Group consisting of $Ti(OCH_2CH_3)_4$, $H_2TiF_6$, $(NH_4)_2TiF_6$, $Na_2TiF_6$, $K_2TiF_6$ and $Ti[SO_4]_2$;
or, mixtures thereof;
(ii) water; and,
(iii) at least one water soluble dye having the structure of formula (I)

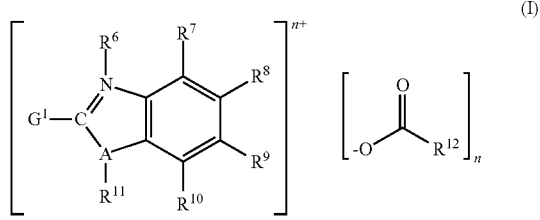

wherein;
$G^1$ is an organic group having from 1 to about 20 carbon atoms and containing at least one oxygen or nitrogen heteroatom;
A is a nitrogen atom or $(-)_3C$—$R^*$, where $R^*$ is a monovalent group chosen from alkyl, cycloalkyl, alkenyl, aralkyl or aryl group each having up to about 10 carbon atoms;
$R^6$ is an alkyl, a hydroxylalkyl, an alkoxyallcyl, a cycloalkyl, an aralkyl optionally substituted with a halogen or alkoxy group, an aryl optionally substituted with a halogen or alkoxy group, a cyanoalkyl, a carbamatoalkyl or a carboalkoxyalkyl group each containing up to about 10 carbon atoms, or hydrogen:,
$R^7$ is an alkyl, alkoxy, aryl alkylsulfonyl, or arylsulfonyl group each containing up to about 10 carbon atoms or hydrogen;
$R^8$ is an alkyl, alkoxy, aryl alkylsulfonyl, arylsulfonyl, or aminosulfonyl group each containing up to about 10 carbon atoms or hydrogen;
$R^9$ is an alkyl, alkoxy, aryl alkylsulfonyl, or arylsulfonyl group each containing up to about 10 carbon atoms or hydrogen;
$R^{10}$ is an alkyl, alkoxy, aryl alkylsulfonyl, or arylsulfonyl group each containing up to about 10 carbon atoms or hydrogen;
$R^{11}$ is an alkyl, a hydroxylalkyl, an alkoxyalkyl, cycloalkyl, an aralkyl optionally substituted with a halogen or alkoxy group, an aryl optionally substituted with a halogen or alkoxy group, a cyanoalkyl, a carbamatoalkyl or an alkoxycarbonylalkyl group each containing up to about 10 carbon atoms or hydrogen
$R^{12}$ is an alkyl group containing from 1 to about 6 carbon atoms or hydrogen; and n is an integer of from 1 to 3, such that when the conversion coating composition is applied to a metal surface, the dye is visible to the naked eye and/or its presence is detectable and its intensity is measurable by optical instrumentation and where the metal surface conversion coating composition does not have detrimental precipitates in the amount of greater than 1000 milligrams of precipitate per kilogram of the conversion coating composition after the coating composition has been stored for a period of at least 48 hours at 25° C.

12. The conversion coating composition of claim 11 wherein the at least one metal corrosion inhibitor (i) is present in the amount of from about 0.01 to about 80 weight percent, based on the total weight of the metal surface conversion coating composition.

13. The conversion coating composition of claim 12 wherein the at least one metal corrosion inhibitor (i) is $H_2ZrF_6$ or $K_2ZrF_6$.

14. The conversion coating composition of claim 12 wherein the at least one metal corrosion inhibitor (i) is $H_2TiF_6$ or $K_2TiF_6$.

15. The conversion coating composition of claim 12 wherein the dye (iii) is in an amount of from about 0.0001 to about 5 weight percent, based on the total weight of the metal surface conversion coating composition.

16. The conversion coating composition of claim 11, wherein the conversion coating composition is a chrome-free conversion coating.

17. A metal surface coated with the conversion coating of claim 11.

* * * * *